(12) United States Patent  
Goto

(10) Patent No.: US 7,538,314 B2  
(45) Date of Patent: May 26, 2009

(54) APPARATUS FOR AND A METHOD OF DISPLAYING AN IMAGE BY PROJECTING LIGHT ONTO A SCREEN

(75) Inventor: Satoshi Goto, Tokyo (JP)

(73) Assignee: Sony Corporation, Tokyo (JP)

( * ) Notice: Subject to any disclaimer, the term of this patent is extended or adjusted under 35 U.S.C. 154(b) by 123 days.

(21) Appl. No.: 11/381,328

(22) Filed: May 2, 2006

(65) Prior Publication Data

US 2006/0261262 A1 Nov. 23, 2006

(30) Foreign Application Priority Data

May 18, 2005 (JP) ............................. 2005-144904

(51) Int. Cl.
*H01J 3/14* (2006.01)
*H01J 5/16* (2006.01)
*H01J 40/14* (2006.01)

(52) U.S. Cl. ...................................... 250/234; 359/298

(58) Field of Classification Search ................. 250/234; 359/298
See application file for complete search history.

(56) References Cited

U.S. PATENT DOCUMENTS

| 5,140,427 | A * | 8/1992 | Nakane et al. | ............... 348/759 |
| 6,836,278 | B2 * | 12/2004 | Saito et al. | .................. 347/233 |
| 2007/0012875 | A1 * | 1/2007 | Miyazawa | .................. 250/234 |

* cited by examiner

*Primary Examiner*—Seung C Sohn  
(74) *Attorney, Agent, or Firm*—K&L Gates LLP

(57) ABSTRACT

A display apparatus is provided. A light beam emitted from a light source is applied through a light modulator and a projecting optical system to a scanning mirror. The light beam is reflected and scanned by the scanning mirror, and applied to a magnifying projection system entrance unit. A detection light beam emitted from a mirror angle detecting light source is reflected and scanned by the scanning mirror, and applied to a linear detector. Operation of the scanning mirror is controlled based on the position of the detection light beam which is detected by the linear detector. The present invention is applicable to a front projector or a rear projector.

11 Claims, 24 Drawing Sheets

APPARATUS FOR AND A METHOD OF DISPLAYING AN IMAGE BY PROJECTING LIGHT ONTO A SCREEN

CROSS REFERENCES TO RELATED APPLICATIONS

The present application claims priority to Japanese Patent Application JP 2005-144904 filed with the Japanese Patent Office on May 18, 2005, the entire contents of which being incorporated herein by reference

BACKGROUND

The present application relates to a display apparatus and a display method, and more particularly to an apparatus for and a method of displaying an image by projecting light onto a screen.

Technologies for projecting image light onto a screen to display an image on the screen have found widespread use in recent years.

Among those technologies are a variety of display systems for generating a two-dimensional image by scanning a one-dimensional image which has been generated by a modulated laser beam and projecting the two-dimensional image onto a screen to display the image on the screen.

One conventional display apparatus of the type referred to above will be described below with reference to FIGS. 1 to 5 of the accompanying drawings.

FIG. 1 is a block diagram of a conventional display apparatus 1. The display apparatus 1 has a light source 11, a light modulator 12, a projecting optical system 13, a light deflector 14, and a magnifying projection system 15. The display apparatus 1 projects image light onto a screen 16 to display an image on the screen 16.

The light source 11 emits a laser beam and applies the laser beam to the light modulator 12.

The light modulator 12 modulates the laser beam emitted from the light source 11. Specifically, the light modulator 12 modulates the laser beam emitted from the light source 11 with an image signal that is supplied to the light modulator 12 to form bright and dark image areas.

The projecting optical system 13 reflects the light beam applied from the light modulator 12 to form a projection image.

The light deflector 14 scans the light beam applied from the projecting optical system 13 to form a second image.

The second image produced by the light deflector 14 is magnified and projected by the magnifying projection system 15 onto the screen 16. Specifically, the magnifying projection system 15 magnifies and projects the second image, which is produced as an intermediate image by the light modulator 12, the projecting optical system 13, and the light deflector 14, onto the screen 16.

The display apparatus 1 displays an image on the screen 16 in the manner described above.

FIG. 2 schematically shows the light source 11, the light modulator 12, the projecting optical system 13, the light deflector 14, and a magnifying projection system entrance unit 25 which is an entrance unit of the magnifying projection system 15. FIG. 3 schematically shows light paths in the light modulator 12, the projecting optical system 13, the light deflector 14, and the magnifying projection system entrance unit 25.

As shown in FIG. 2, a condensing optical system 21 is provided for condensing the light beam from the light source 11 and applying the condensed light beam to the light modulator 12. Though the condensing optical system 21 is shown as including a single lens in FIG. 2, it actually is arranged to apply a linear beam, which extends along an array of light modulating elements of the light modulator 12, to the light modulator 12.

The projecting optical system 13 includes a main mirror 22 and an auxiliary mirror 23 disposed in confronting relation to the main mirror 22. The main mirror 22 reflects the light beam from the light modulator 12 to the auxiliary mirror 23, and reflects again a light beam reflected from the auxiliary mirror 23 to a scanning mirror 24 of the light deflector 14. The auxiliary mirror 23 reflects the light beam from the main mirror 22 back to the main mirror 22.

The scanning mirror 24 of the light deflector 14 reflects the light beam from the projecting optical system 13 while it is being angularly moved through a predetermined angle about a given axis. The scanning mirror 24 scans an image that is formed by the light beam modulated by the light modulator 12 and reflected by the projecting optical system 13, forming a two-dimensional image 26 in the magnifying projection system entrance unit 25 which is an entrance unit of the magnifying projection system 15.

FIG. 4 shows in block form the light deflector 14 of the conventional display apparatus 1.

As shown in FIG. 4, the light deflector 14 includes the scanning mirror 24, a galvanometer motor 31, a rotary encoder 32, a motor control circuit 33, and a motor driver circuit 34.

The galvanometer motor 31 is energized by the motor driver circuit 34 to angularly move the scanning mirror 24 that is coupled to the galvanometer motor 31 by a shaft thereof. The rotary encoder 32 is coupled to the galvanometer motor 31 by another shaft thereof which is coaxial with the first-mentioned shaft. The rotary encoder 32 detects an angle of the first-mentioned shaft, i.e., the scanning mirror 24, and supplies a signal representing the detected angle to the motor control circuit 33. The term "rotary encoder" generally refers to a sensor for detecting an angle of a shaft. The motor control circuit 33 supplies a control signal for controlling the energization of the galvanometer motor 31 to the motor driver circuit 34 based on the signal supplied from the rotary encoder 32 as representing the angle of the first-mentioned shaft, i.e., the scanning mirror 24. Specifically, the motor control circuit 33 compares a preset shaft angle and the shaft angle represented by the signal supplied from the rotary encoder 32, and supplies a control signal depending on the difference between the compared angles, i.e., an error, to the motor driver circuit 34.

Based on the control signal supplied from the motor control circuit 33, the motor driver circuit 34 supplies a current for energizing the galvanometer motor 31 to the galvanometer motor 31, thereby energizing the galvanometer motor 31.

As described above, the light deflector 14 of the conventional display apparatus 1 detects an angle of the scanning mirror 24 and angularly moves the scanning mirror 24 based on the detected angle of the scanning mirror 24.

The scanning mirror 24 may include a so-called polygon mirror (polygonal mirror). If the scanning mirror 24 includes a polygon mirror, then the galvanometer motor 31 is replaced with a constant-speed motor for rotating the polygon mirror. The constant-speed motor has a shaft rotatable at a constant rate in a constant direction to rotate the polygon mirror. The rotary encoder 32 is coaxial with the shaft of the constant-speed motor and detects an angle of the shaft of the constant-speed motor.

If the polygon mirror and the constant-speed motor are employed, then the motor control circuit 33 supplies a control signal for controlling the energization of the constant-speed motor to the motor driver circuit 34 based on the signal supplied from the rotary encoder 32 as representing the angle of the shaft of the constant-speed motor. The motor driver circuit 34 energizes the constant-speed motor based on the control signal supplied from the motor control circuit 33.

However, various problems arise when the rotary encoder 32 detects an angle of the scanning mirror 24.

FIG. 5 shows various factors for producing errors between an image projected by the conventional display apparatus 1 onto the screen 16 and the angle of the shaft of the galvanometer motor 31

Since the scanning mirror 24 is mounted on the shaft of the galvanometer motor 31, a difference (error) is developed between the angle of the shaft of the galvanometer motor 31 and the angle of the scanning mirror 24 due to a misalignment between the shaft of the galvanometer motor 31 and the scanning mirror 24. A difference (error) is also developed between the angle of the shaft of the galvanometer motor 31 and the angle of the scanning mirror 24 because of a torsion and resonance of the shaft of the galvanometer motor 31 and the scanning mirror 24.

Specifically, the scanning mirror 24 scans an image projected from the projecting optical system 13 at an angle which is different (due to an error) from the angle of the shaft of the galvanometer motor 31, thereby forming a two-dimensional image, and applies the formed two-dimensional image to the magnifying projection system entrance unit 25.

Stated otherwise, an image that is affected by an error which is developed between the angle of the shaft of the galvanometer motor 31 and the angle of the scanning mirror 24 due to a misalignment, torsion, and resonance of the shaft of the galvanometer motor 31 and the scanning mirror 24, is projected by the magnifying projection system entrance unit 25 onto the screen 16.

A similar problem exists with respect to the control loop for controlling the galvanometer motor 31, i.e., the rotary encoder 32, the motor control circuit 33, and the motor driver circuit 34. Specifically, since the rotary encoder 32 is coaxial with the shaft of the galvanometer motor 31 for angularly moving the scanning mirror 24, a difference (error) is developed between the angle of the shaft of the galvanometer motor 31 and the angle of the shaft of the rotary encoder 32 due to a misalignment between the shaft of the galvanometer motor 31 and the shaft of the rotary encoder 32. A difference (error) is also developed between the angle of the shaft of the galvanometer motor 31 and the angle of the shaft of the rotary encoder 32 because of a torsion and resonance of the shaft of the galvanometer motor 31 and the shaft of the rotary encoder 32.

The angle detected by the rotary encoder 32 contains an error of the rotary encoder 32 and a quantization error produced thereby.

In addition, when the shaft of the rotary encoder 32 is turned through a certain angle, i.e., to a predetermined angular position, a certain period of time needs to be consumed before the rotary encoder 32 outputs a signal representing the certain angle. Therefore, when the rotary encoder 32 detects an angle, a certain time delay exists before the rotary encoder 32 actually outputs a signal representing the detected angle.

As described above, the signal output from the rotary encoder 32 contains errors with respect to the angle of the shaft of the galvanometer motor 31 due to the misalignment, torsion, and resonance of the shaft of the galvanometer motor 31 and the shaft of the rotary encoder 32, the error of the rotary encoder 32 and the quantization error produced thereby, and the error due to the timed delay of the output signal from the rotary encoder 32.

A servo mechanism including the motor control circuit 33, the motor driver circuit 34, and the galvanometer motor 31 controls the angle of the shaft of the galvanometer motor 31 based on the signal, including the above errors, from the rotary encoder 32.

The errors caused by the misalignment, torsion, and resonance of the shaft of the galvanometer motor 31 and the shaft of the scanning mirror 24 are different from the errors caused by the misalignment, torsion, and resonance of the shaft of the galvanometer motor 31 and the shaft of the rotary encoder 32 and the quantization error produced thereby, and the error due to the timed delay of the output signal from the rotary encoder 32. As viewed from the image projected onto the screen 16, the signal output from the rotary encoder 32 is affected by all these errors.

The rotary encoder 32 is highly expensive if it is of high resolution and high accuracy.

If the shaft of the galvanometer motor 31 is extended and the rotary encoder 32 is mounted on the extended shaft, then the moment of inertia of the shaft which turns in unison with the scanning mirror 24 increases. The galvanometer motor 31 reciprocally angularly moves its shaft periodically in alternate directions. If the moment of inertia of the shaft increases, then a large amount of energy is required to accelerate and decelerate the shaft in its turning motion. As a result, it is highly difficult to control the galvanometer motor 31 with the extended shaft.

SUMMARY

There is a need to provide an apparatus for and a method of displaying an image highly accurately and inexpensively.

An apparatus for displaying an image according to an embodiment includes a projecting optical system for producing a first image based on a modulated light beam, a reflecting section for scanning said first image produced by said projecting optical system in a direction perpendicular to a longitudinal direction of said first image to produce a second image, an irradiating section for irradiating said reflecting section with a detection light beam which is different from said modulated light beam, a detecting section for detecting the position of said detection light beam reflected by said reflecting section to detect the position of said first image reflected by said reflecting section in said second image, and a control section for controlling operation of said reflecting section based on the position of said first image in said second image as detected by said detecting section.

The reflecting section may include a galvanometer mirror, a polygon mirror, or a polygon prism.

The irradiating section may include a light source.

The apparatus may further include a light source for emitting a light beam to produce said first image. The irradiating section may include a light modulator for modulating the light beam emitted by said light source and reflecting the light beam emitted by said light source separately from said modulated light, as said detection light beam to irradiate said reflecting section, and said detection light beam reflected by said light modulator may be applied through said projecting optical system to said reflecting section.

The reflecting section may have a first reflecting surface for reflecting said first image and a second reflecting surface for reflecting said second image. The irradiating section may apply said detection light beam to said second reflecting surface of said reflecting section, and said detecting section may detect the position of said detection light beam reflected by said second reflecting surface of said reflecting section to detect the position of said first image in said second image.

According to an embodiment, there is also provided a method of displaying an image with a displaying apparatus having a projecting optical system for producing a first image based on a modulated light beam, and a reflecting section for scanning said first image produced by said projecting optical system in a direction perpendicular to a longitudinal direction of said first image to produce a second image, said method including the steps of irradiating said reflecting section with a detection light beam which is different from said modulated light beam, detecting the position of said detection light beam reflected by said reflecting section to detect the position of said first image reflected by said reflecting section in said second image, and controlling operation of said reflecting section based on the position of said first image in said second image as detected in said step of detecting the position of said detection light beam.

In the apparatus for displaying an image according to an embodiment, the first image produced by the projecting optical system based on the modulated light is scanned in the direction perpendicular to the longitudinal direction of the first image and reflected to form the second image. The detection light beam which is different from the modulated light beam is applied to the reflecting section and the position of the reflected detection light beam is detected to detect the position of the reflected first image in the second image. Operation of the reflecting section is controlled based on the detected position of the first image in the second image.

In the method of displaying an image according to an embodiment, the reflecting section is irradiated with the detection light beam which is different from the modulated light beam, and the position of the reflected detection light beam is detected to detect the position of the reflected first image in the second image. Operation of the reflecting section is controlled based on the detected position of the first image in the second image.

According to an embodiment, as described above, it is possible to display the second image by scanning the first image based on the modulated beam. Furthermore, the display of the second image can be controlled more accurately with an inexpensive arrangement.

The above and other objects, features, and advantages of the present invention will become apparent from the following description when taken in conjunction with the accompanying drawings which illustrate preferred embodiments of the present invention by way of example.

Additional features and advantages are described herein, and will be apparent from, the following Detailed Description and the figures.

DETAILED DESCRIPTION

Figure 1:
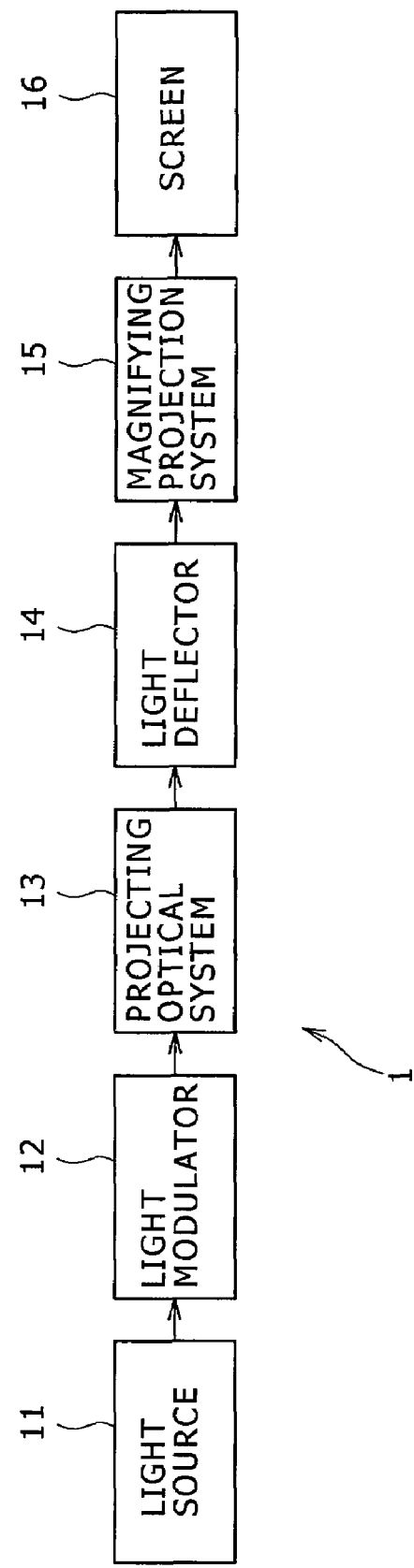
FIG. 1 is a block diagram of a conventional display apparatus.
Figure 2:
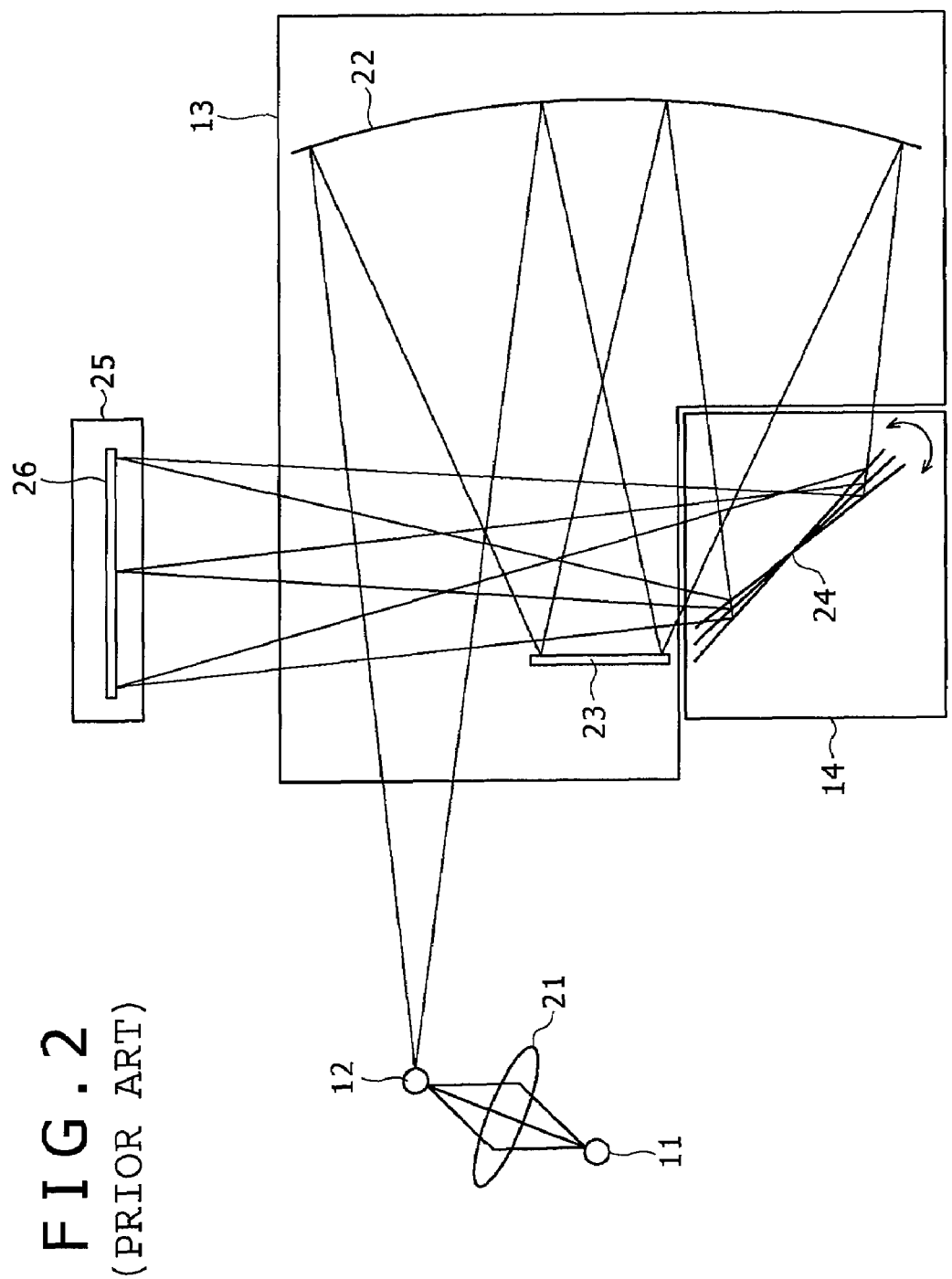
FIG. 2 is a schematic plan view of the conventional display apparatus.
Figure 3:
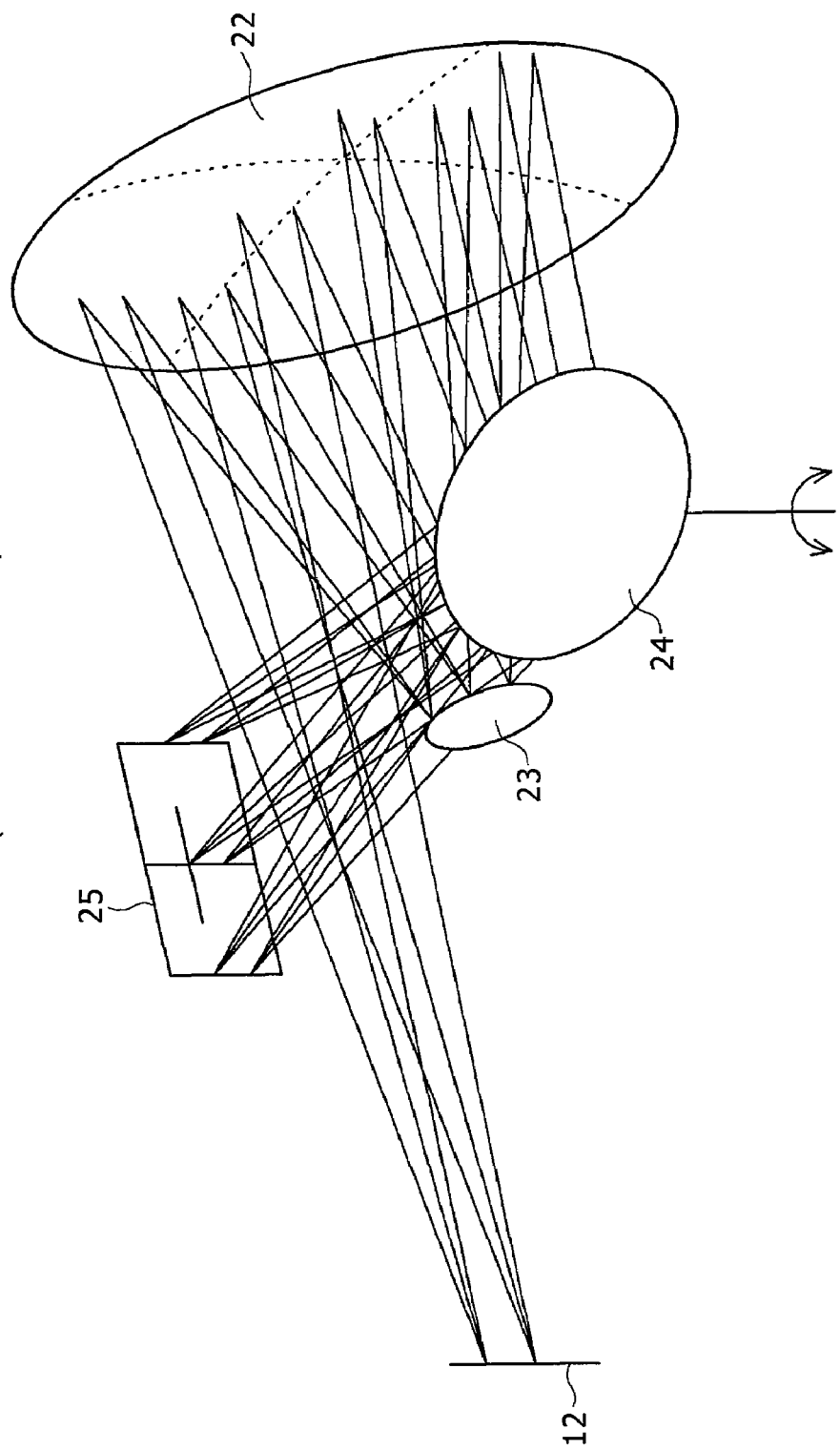
FIG. 3 is a schematic perspective view showing light paths of the conventional display apparatus.
Figure 4:
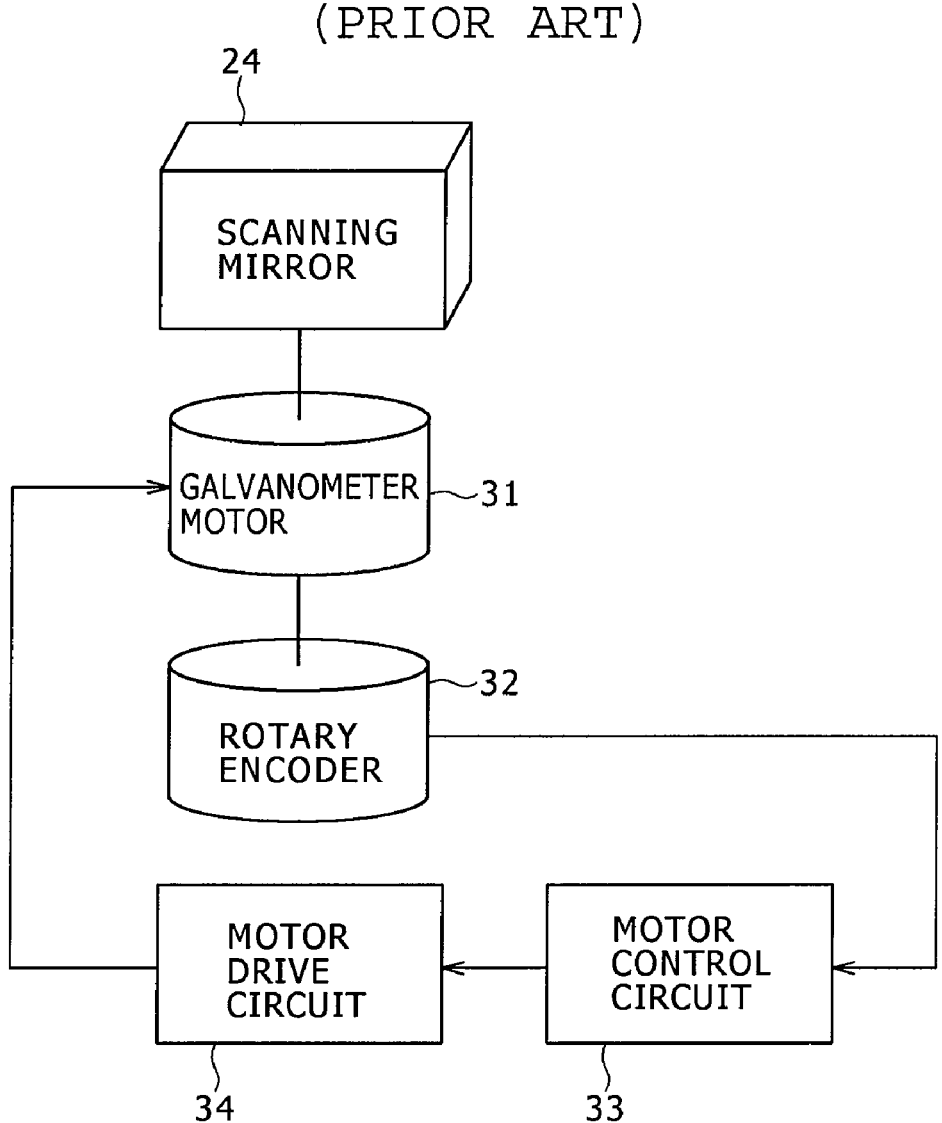
FIG. 4 is a block diagram of a light deflector of the conventional display apparatus.
Figure 5:
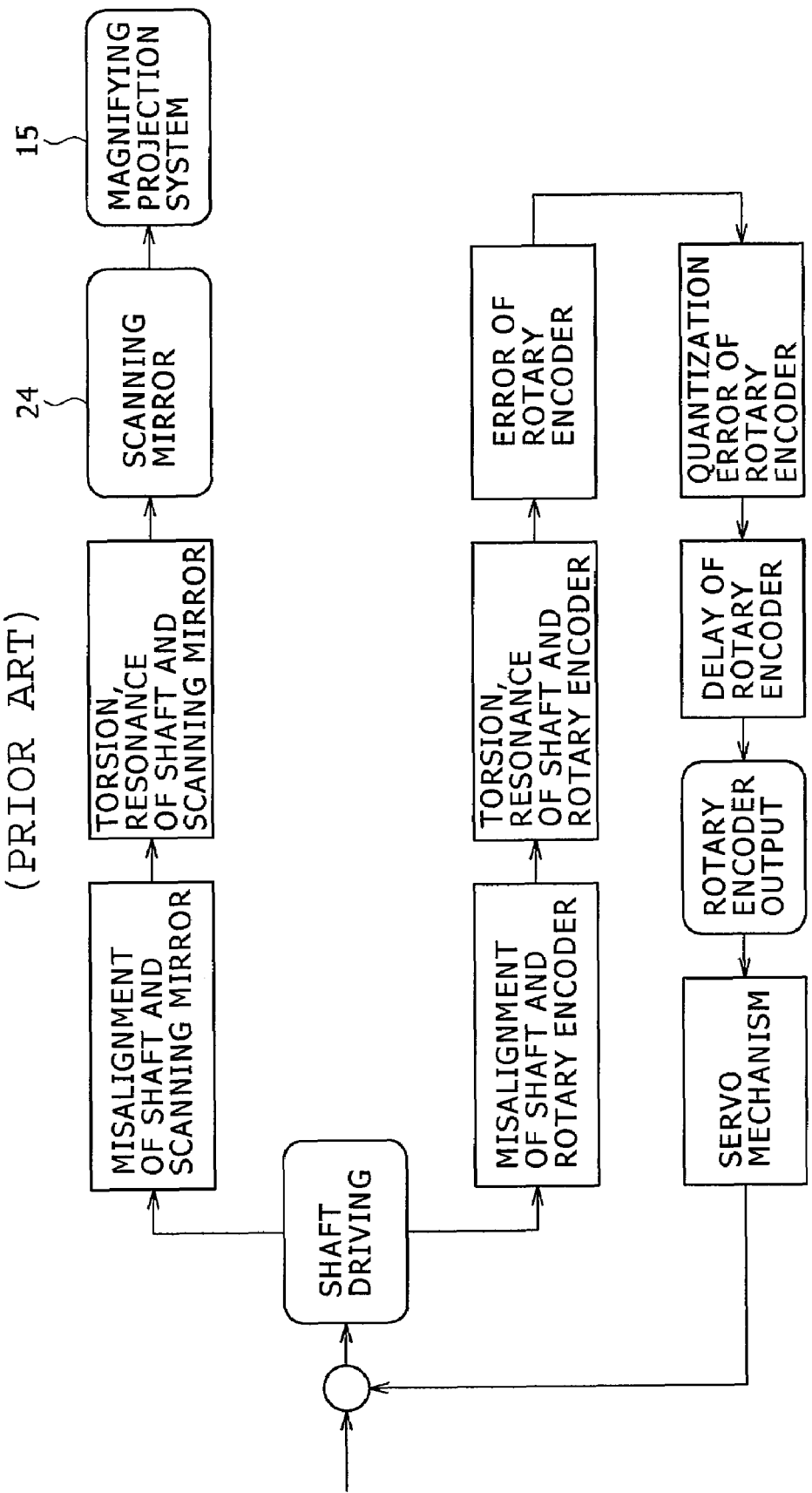
FIG. 5 is a block diagram showing factors for producing errors between an image projected by the conventional display apparatus onto a screen and the angle of the shaft of a galvanometer motor.

According to an embodiment, there is provided an apparatus for displaying an image, including a projecting optical system (e.g., a projection optical system 113 shown in FIG. 7) for producing a first image based on a modulated light beam, a reflecting section (e.g., a scanning mirror 124 shown in FIG. 7) for scanning the first image produced by the projecting optical system in a direction perpendicular to a longitudinal direction of the first image to produce a second image, an irradiating section (e.g., a mirror angle detecting light source 131 shown in FIG. 7) for irradiating the reflecting section with a detection light beam which is different from the modulated light beam, a detecting section (e.g., a linear detector 133 shown in FIG. 7) for detecting the position of the detection light beam reflected by the reflecting section to detect the position of the first image reflected by the reflecting section in the first position, and a control section (e.g., a motor control circuit 142 shown in FIG. 9) for controlling operation of the reflecting section based on the position of the first image in the second image as detected by the detecting section.

In the above apparatus, the reflecting section may include a galvanometer mirror (e.g., a scanning mirror 124 shown in FIG. 7), a polygon mirror, or a polygon prism.

Figure 7:
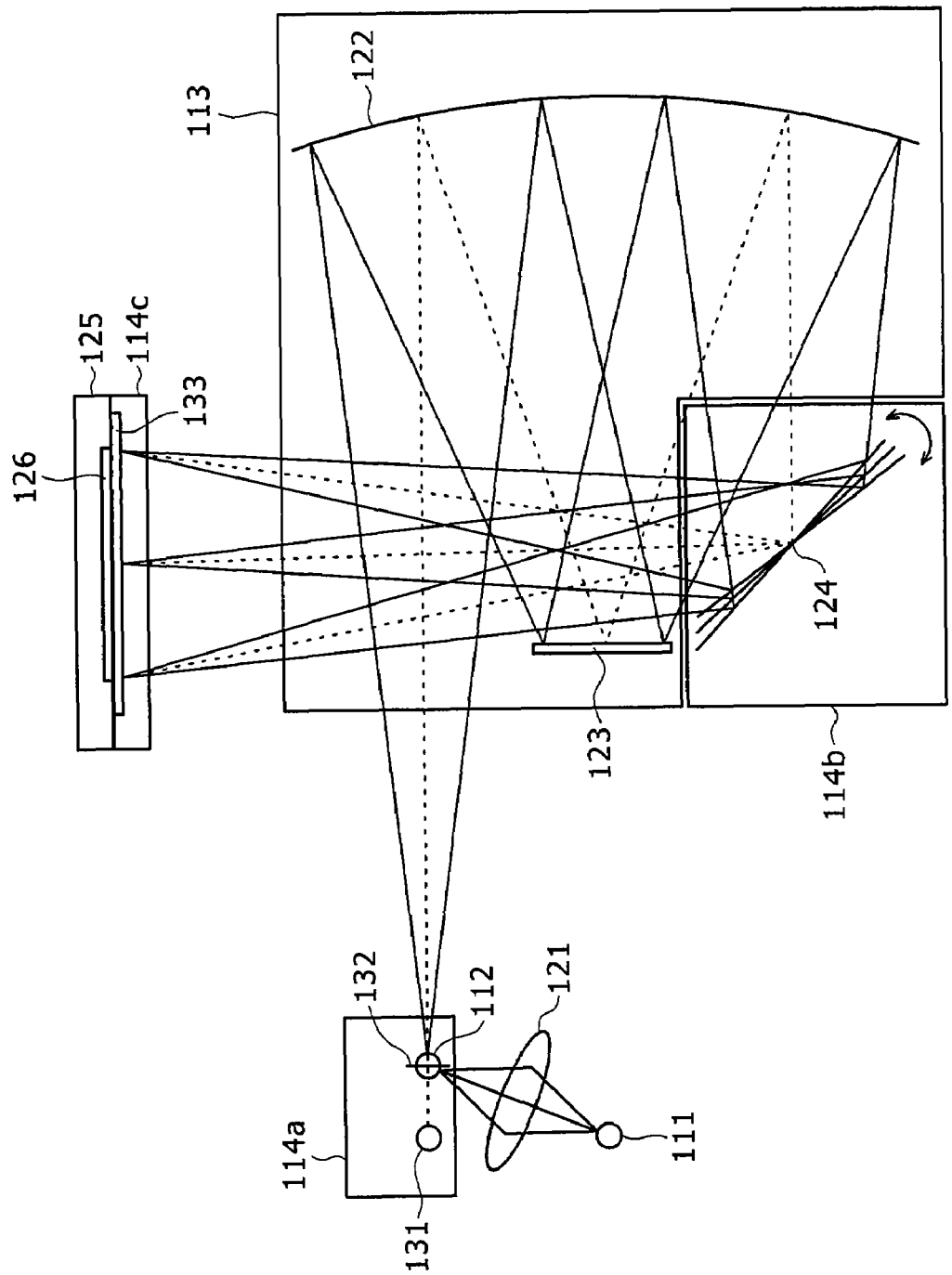
FIG. 7 is a schematic plan view of a light source, a light modulator, a projecting optical system, a light deflecting system, and a magnifying projection system of the display apparatus shown in FIG. 6.

In the above apparatus, the irradiating section may include a light source (e.g., a mirror angle detecting light source 131 shown in FIG. 7).

The above apparatus may further include a light source for emitting a light beam to produce the first image, and the irradiating section may include a light modulator (e.g., a GLV 231 shown in FIG. 15) for modulating the light beam emitted by the light source and reflecting the light beam emitted by the light source separately from the modulated light, as the detection light beam to irradiate the reflecting section, and the detection light beam reflected by the light modulator may be applied through the projecting optical system to the reflecting section.

In the above apparatus, the reflecting section may have a first reflecting surface for reflecting the first image and a second reflecting surface for reflecting the second image, the irradiating section may apply the detection light beam to the second reflecting surface of the reflecting section, and the detecting section may detect the position of the detection light beam reflected by the second reflecting surface of the reflecting section to detect the position of the first image in the second image.

Figure 10:
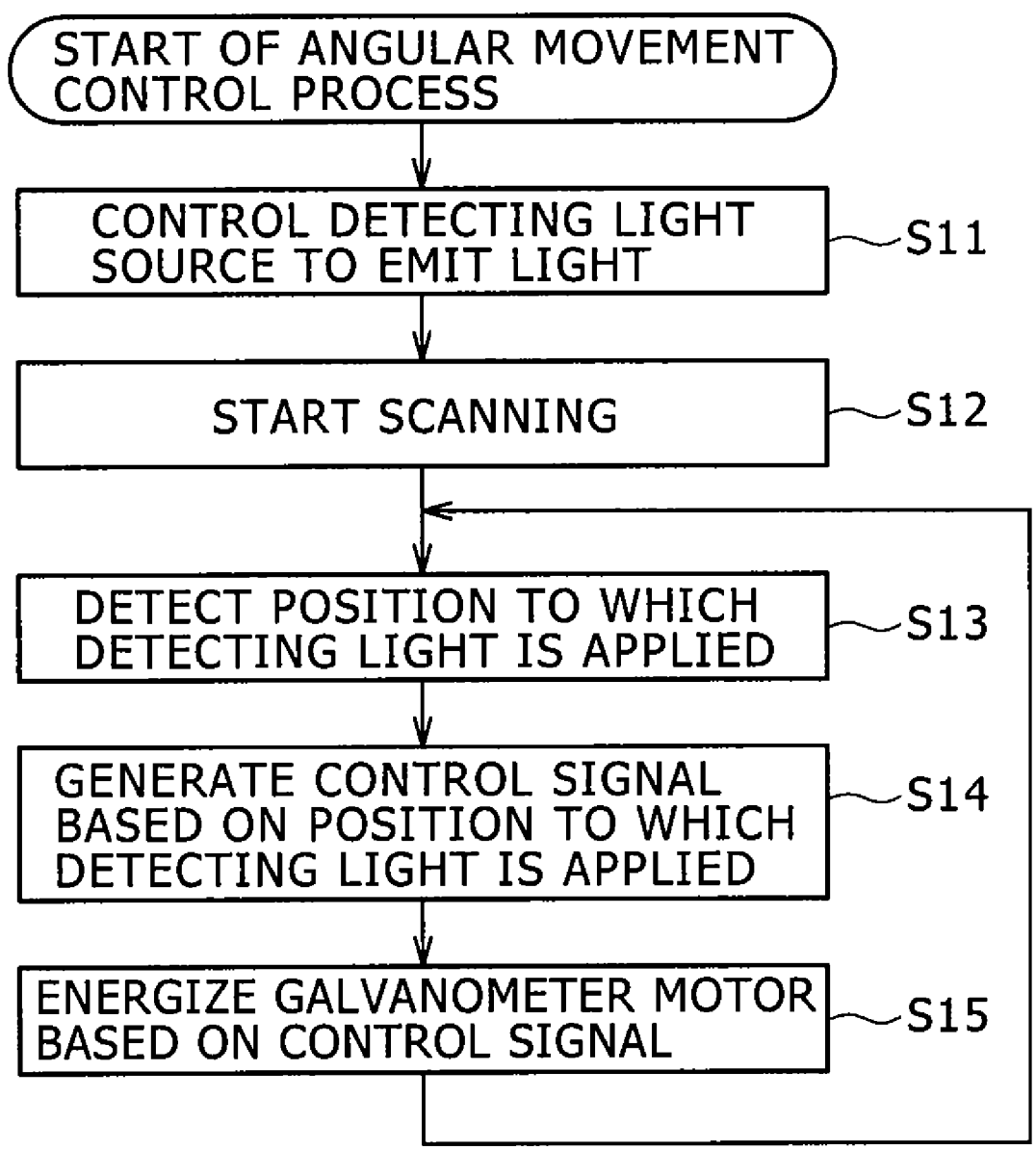
FIG. 10 is a flowchart of an angular movement control process of the display apparatus shown in FIG. 6.

According to an embodiment, there is also provide a method of displaying an image with a displaying apparatus having a projecting optical system (e.g., a projection optical system 113 shown in FIG. 7) for producing a first image based on a modulated light beam, and a reflecting section (e.g., a scanning mirror 124 shown in FIG. 7) for scanning the first image produced by the projecting optical system in a direction perpendicular to a longitudinal direction of the first image to produce a second image, the method including the steps of irradiating the reflecting section with a detection light beam which is different from the modulated light beam (e.g., step S11 shown in FIG. 10), detecting the position of the detection light beam reflected by the reflecting section to detect the position of the first image reflected by the reflecting section in the second image (e.g., step S13 shown in FIG. 10), and controlling operation of the reflecting section based on the position of the first image in the second image as detected in the step of detecting the position of the detection light beam (e.g., step S14 and step S15 shown in FIG. 10).

Figure 6:
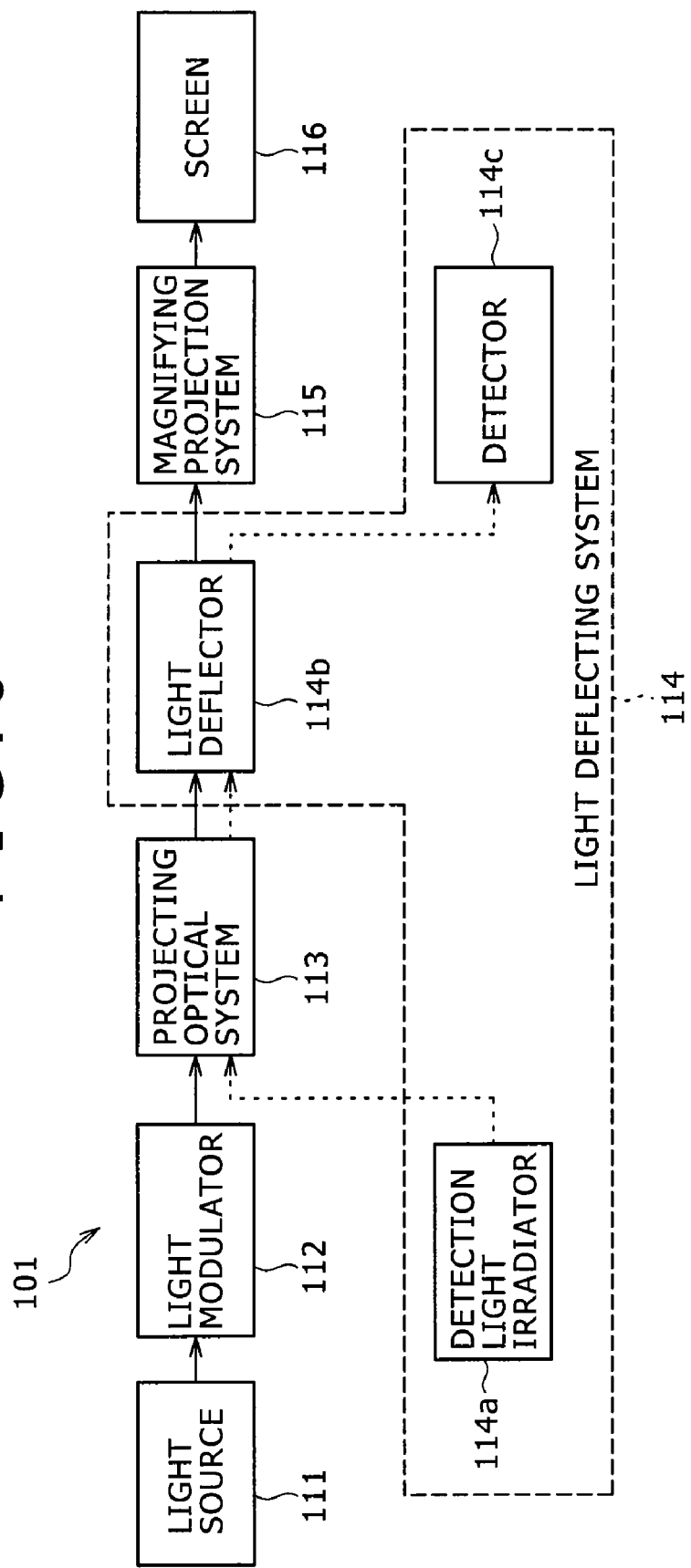
FIG. 6 is a block diagram of a display apparatus according to an embodiment.

FIG. 6 shows in block form a display apparatus 101 according to an embodiment. As shown in FIG. 6, the display apparatus 101 has a light source 111, a light modulator 112, a projecting optical system 113, a light deflecting system 114, and a magnifying projection system 115. The light deflecting system 114 includes a detection light irradiator 114a, a light deflector 114b, and a detector 114c. The display apparatus 101 projects image light onto a screen 116 to display an image on the screen 116. For example, the display apparatus 101 displays a moving image.

The screen 116 may be positioned outside of the display apparatus 101 or may be integral with the display apparatus 101.

The light source 111 emits a laser beam and applies the laser beam to the light modulator 112. For example, the light source 111 includes a laser device for emitting a laser beam of three primaries, i.e., red, blue, and green, including laser light of a single frequency in a coherent beam, and applies the laser beam to the light modulator 112. The light source 111 may be a gas laser device or a solid-state laser device insofar as it can emit light in a desired strength or hue.

The light modulator 112 modulates the laser beam emitted from the light source 111. Specifically, the light modulator 112 modulates the laser beam emitted from the light source 111 with an image signal that is supplied to the light modulator 112 to form bright and dark image areas.

The light modulator 112 may include a GLV (Grating Light Valve) which is a one-dimensional light modulator manufactured by Silicon Light Machines, USA (see U.S. Pat. No. 5,311,360), for example The GLV includes a phase reflection diffraction grating fabricated according to the MEMS (MicroElectroMechanical System) technology. The phase reflection diffraction grating, typically the GLV, needs a light source, preferably a coherent light source, because the light modulator does not emit light.

The projecting optical system 113 reflects the light beam applied from the light modulator 112 to form a projection image. The projecting optical system 113 may be an Offfner optical system disclosed in U.S. Pat. No. 3,748,015, as a basic equal-magnification projection system, for example. The light beam input from the light modulator 112 is reflected three times by reflecting mirrors in the projecting optical system 113. The projecting optical system 113, which is an Offner optical system, includes a pair of reflecting mirrors for reflecting the light beam with concentric curved surfaces having the same radius of curvature for the first and third times, and reflecting the light beam with another surface for the second time. If the GLV is used as the light modulator 112, then the projecting optical system 113 generates a one-dimensional image based on the light beam modulated by the light modulator 112.

The light deflecting system 114 has the detection light irradiator 114a, the light deflector 114b, and the detector 114c, as described above. The light deflecting system 114 generates a two-dimensional image by scanning the light beam modulated by the light modulator 112 through the projecting optical system 113. Specifically, the light deflector 114b generates a two-dimensional image by scanning the image formed by the projecting optical system 113 in a direction perpendicular to a longitudinal direction of the image formed by the projecting optical system 113.

The detection light irradiator 114a irradiates the projecting optical system 113 with detection light for detecting the position of the image formed by the projecting optical system 113 in the two-dimensional image. The light deflector 114b scans the detection light as it has passed through the projecting optical system 113 as with the modulated light beam from the light modulator 112. The detector 114c detects the position of the scanned detection light, thereby detecting the position of the image formed by the projecting optical system 113 in the two-dimensional image. The detection light passes along a path indicated by the dotted lines in FIG. 6.

The two-dimensional image produced through the light deflector 114b is magnified and projected by a magnifying projection system entrance unit 125 (see FIG. 7) onto the screen 116. The magnifying projection system entrance unit 125 is an optical system for magnifying and projecting the two-dimensional image, which is produced as an intermediate image by the light modulator 112 and the light deflecting system 114, onto the screen 116.

Figure 8:
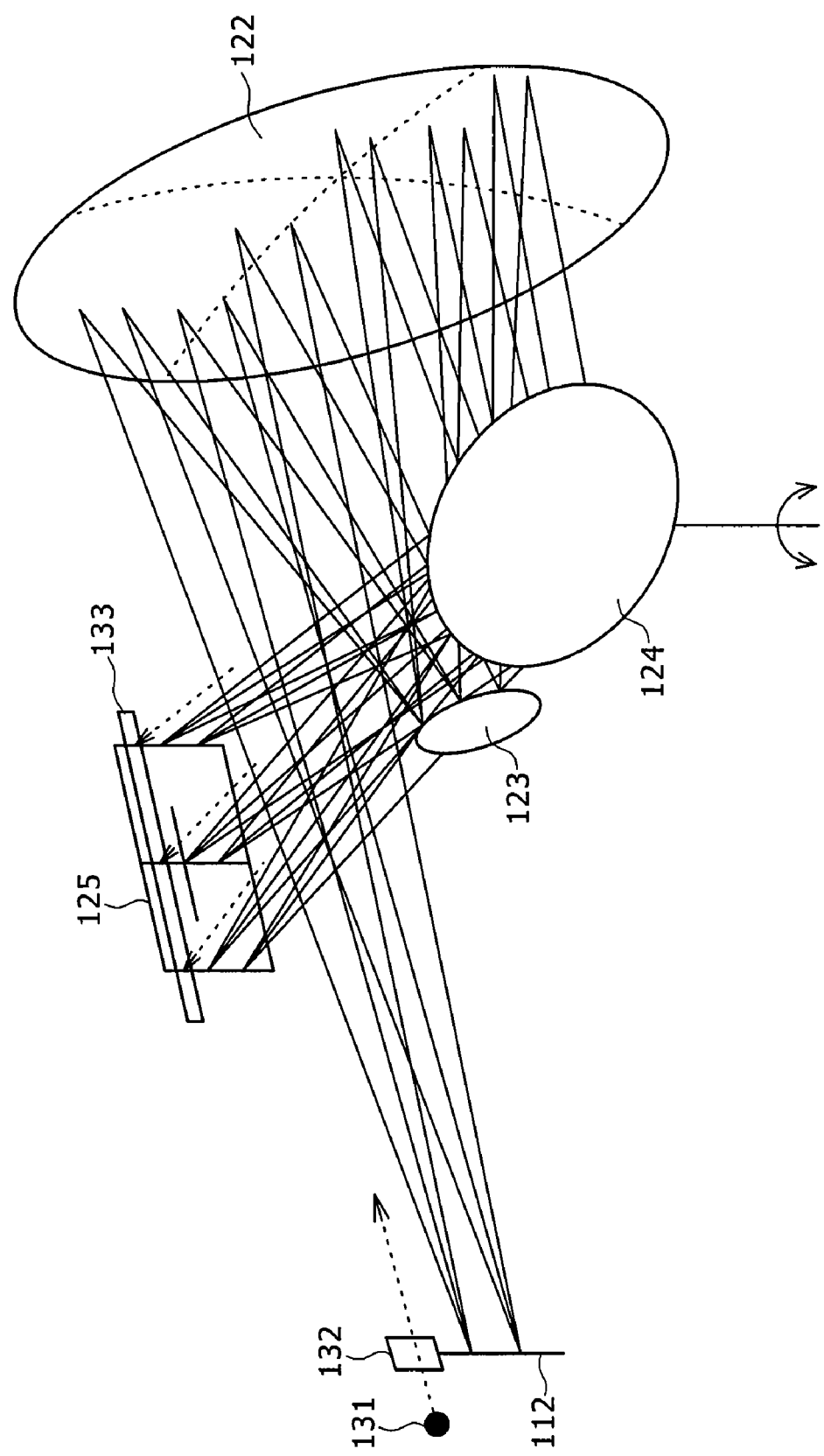
FIG. 8 is a schematic perspective view showing light paths in the light modulator, the projecting optical system, the light deflecting system, and the magnifying projection system shown in FIG. 7.

FIG. 7 schematically shows the light source 111, the light modulator 112, the projecting optical system 113, the light deflecting system 114, and the magnifying projection system entrance unit 125 of the magnifying projection system 115. FIG. 8 schematically shows light paths in the light modulator 112, the projecting optical system 113, the light deflecting system 114, and the magnifying projection system entrance unit 125 of the magnifying projection system 115.

The detection light irradiator 114a irradiates the projecting optical system 113 with a detection light beam for detecting the position of the image formed by the projecting optical system 113 in the two-dimensional image. The light deflector 114b scans the modulated light from the light modulator 112 as it has passed through the projecting optical system 113, thereby forming a two-dimensional image. The light deflector 114b also scan the detection light beam as it has passed through the projecting optical system 113. The detector 114c detects the position of the scanned detection light beam.

The laser beam emitted from the light source 111 is applied to a condensing optical system 121.

The condensing optical system 121 is provided for condensing the light beam from the light source 111 and applying the condensed light beam to the light modulator 112. Though the condensing optical system 121 is shown as including a single optical lens in FIG. 7, it actually is arranged to apply a linear beam, which extends along an array of light modulating elements of the light modulator 112, to the light modulator 112. The condensing optical system 121 may include a Kohler illumination system having a uniform numerical aperture for achieving intensive illumination, for example.

If the condensing optical system 121 includes a Kohler illumination system, then it is possible to independently adjust the illuminated area and the numerical aperture (NA) of illumination.

The light beam condensed by the condensing optical system 121 is applied to the light modulator 112. The light modulator 112 includes a GLV, for example. The light beam applied to the light modulator 112 in the form of a GLV is reflected and diffracted by the light modulator 112.

A GLV as an example of the light modulator 112 will be described below. The GLV includes an array of light modulating elements in the form of microscopic ribbons disposed on a silicon substrate. Each of the light modulating elements of the GLV is moved a small distance by an electric signal to change the amount of diffraction of light applied thereto. Therefore, depending on an electric signal applied to the GLV, bright and dark image areas are developed by light emitted from the GLV. Specifically, each of the light modulating elements of the GLV generates a bright or dark image area in its diffracted light depending on the electric signal applied thereto. The GLV serves as a one-dimensional light modulator for modulating light emitted from the light source 111 depending on an electric signal applied thereto.

It has been described above that the one-dimensional light modulator having an array of light modulating elements includes a GLV. However, the light modulator 112 is not limited to having an array of light modulating elements, but may be a spatial light modulator having a plurality of arrays of light modulating elements for modulating a plurality of respective light beams. For example, the light modulator 112 may include two arrays of light modulating elements, and an image formed by light emitted from those arrays of light modulating elements may be scanned by the light deflecting system 114 in a direction perpendicular to the direction of the arrays, i.e., the longitudinal direction of the arrays, for thereby producing a desired two-dimensional image.

The light beam modulated by the light modulator 112 is applied to the projecting optical system 113. The projecting optical system 113 includes a main mirror 122 and an auxiliary mirror 123 disposed in confronting relation to the main mirror 122 in an Offner optical system configuration.

The main mirror 122 of the projecting optical system 113 reflects the modulated light beam from the light modulator 112 to the auxiliary mirror 123, and reflects again a light beam reflected from the auxiliary mirror 123 to a scanning mirror 124 of the light deflecting system 114. The auxiliary mirror 123 reflects the light beam from the main mirror 122 back to the main mirror 122.

The modulated light beam that has been reflected twice by the main mirror 122 is applied to the light deflector 114b which includes the scanning mirror 124.

The scanning mirror 124, which is disposed in the light deflector 114b, includes a so-called galvanometer mirror in the form of a planar mirror. The scanning mirror 124 reflects the light beam from the projecting optical system 113 while it is being angularly moved through a predetermined angle about a given axis. Specifically, the scanning mirror 124 reflects and scans the light beam that has been modulated by the light modulator 112 and applied through the projecting optical system 113. Stated otherwise, the scanning mirror 124 scans a projected image produced by the projecting optical system 113 in a direction perpendicular to a longitudinal direction of the projected image and reflects the image into a two-dimensional image 126.

The two-dimensional image 126 formed by the scanning mirror 124 is applied to the magnifying projection system entrance unit 125.

The detection light irradiator 114a has a mirror angle detecting light source 131 and an aperture 132. The mirror angle detecting light source 131 emits a detection light beam to the projecting optical system 113 for detecting the position of the produced image produced by the projecting optical system 113, in the two-dimensional image 126 applied to the magnifying projection system entrance unit 125. The mirror angle detecting light source 131 includes an LED (Light Emitting Diode) or a laser diode.

The mirror angle detecting light source 131 is arranged such that the position in the vertical direction (the direction of the array of light modulating elements of the light modulator 112) of the optical axis of the modulated light beam applied from the light modulator 112 to the main mirror 122 and the position in the vertical direction of the optical axis of the detection light beam applied from the mirror angle detecting light source 131 to the main mirror 122 are aligned with each other, and also that the detection light beam does not fall upon the magnifying projection system entrance unit 125.

The mirror angle detecting light source 131 may include a light source for emitting invisible light, e.g., an infrared radiation, so that any leakage of the detection light beam will not affect the image displayed on the screen 116, or the image displayed on the screen 116 will be prevented from being degraded by any leakage of the detection light beam.

The aperture 132 restricts the detection light beam emitted from the mirror angle detecting light source 131 to apply a sufficiently small spot of a detection light beam to the detector 114c. If the width of the spot of a detection light beam applied to the detector 114c is large compared with the resolution of the detector 114c, then detector 114c detects the position of the detection light beam with reduced accuracy. Therefore, the aperture 132 restricts the detection light beam emitted from the mirror angle detecting light source 131 to allow the detector 114c to detect the position of the detection light beam according to the resolution of the detector 114c.

For example, if the aperture 132 is positioned such that the position in the vertical direction (the direction of the array of light modulating elements of the light modulator 112) of the light modulator 112 and the position in the vertical direction of the aperture 132 are aligned with each other, then the detector 114c is irradiated with a spot of a detection light beam whose size is equal to the size of the aperture 132.

The scanning mirror 124 reflects and scans the light beam modulated by the light modulator 112, and also reflects and scans the detection light beam emitted from the mirror angle detecting light source 131. The detection light beam is thus scanned and reflected in the same manner as the projected image produced by the projecting optical system 113. The detection light beam reflected by the scanning mirror 124 is applied to the detector 114c.

The detector 114c has a linear detector 133 for detecting the position of the detection light beam applied to the linear detector 133. The linear detector 133 includes a one-dimensional light position detector having detecting elements on its detecting surface for outputting a signal indicative of the position of the detection light beam thereon.

For example, the linear detector 133 may include a photodiode array, a one-dimensional PSD (Position Sensitive Detector), a one-dimensional CCD (Charge Coupled Device), a one-dimensional CMOS (Complementary Metal-Oxide Semiconductor) photosensor, or the like sensor.

For example, the one-dimensional PSD has a resistive layer on its detecting surface. When light is applied to the detecting surface of the one-dimensional PSD, a photocurrent is generated at the incident position on the detecting surface where the light is applied. The photocurrent is distributed into a plurality of electrodes connected to an end of the resistive layer. Resistance ratios between the incident position and the electrodes can be detected from the ratios of currents from the respective electrodes. In this manner, the one-dimensional PSD can detect the position of the light applied to the detecting surface.

Since the scanning mirror 124 reflects and scans the modulated light from the light modulator 112 and also reflects and scans the detection light beam emitted from the mirror angle detecting light source 131 and applied through the projecting optical system 113, the position of the projected image produced by the projecting optical system 113 can be known from the position of the detection light beam reflected by the scanning mirror 124. Specifically, the linear detector 133 detects the position of the projected image produced by the projecting optical system 113 by detecting the position of the detection light beam reflected by the scanning mirror 124.

The linear detector 133 outputs a signal representative of the detected position of the detection light beam. Stated otherwise, the signal output from the linear detector 133 indicates the position of the projected image produced by the projecting optical system 113.

The linear detector 133 may not be a single unitary photosensor, but may include a plurality of photosensors.

Figure 9:
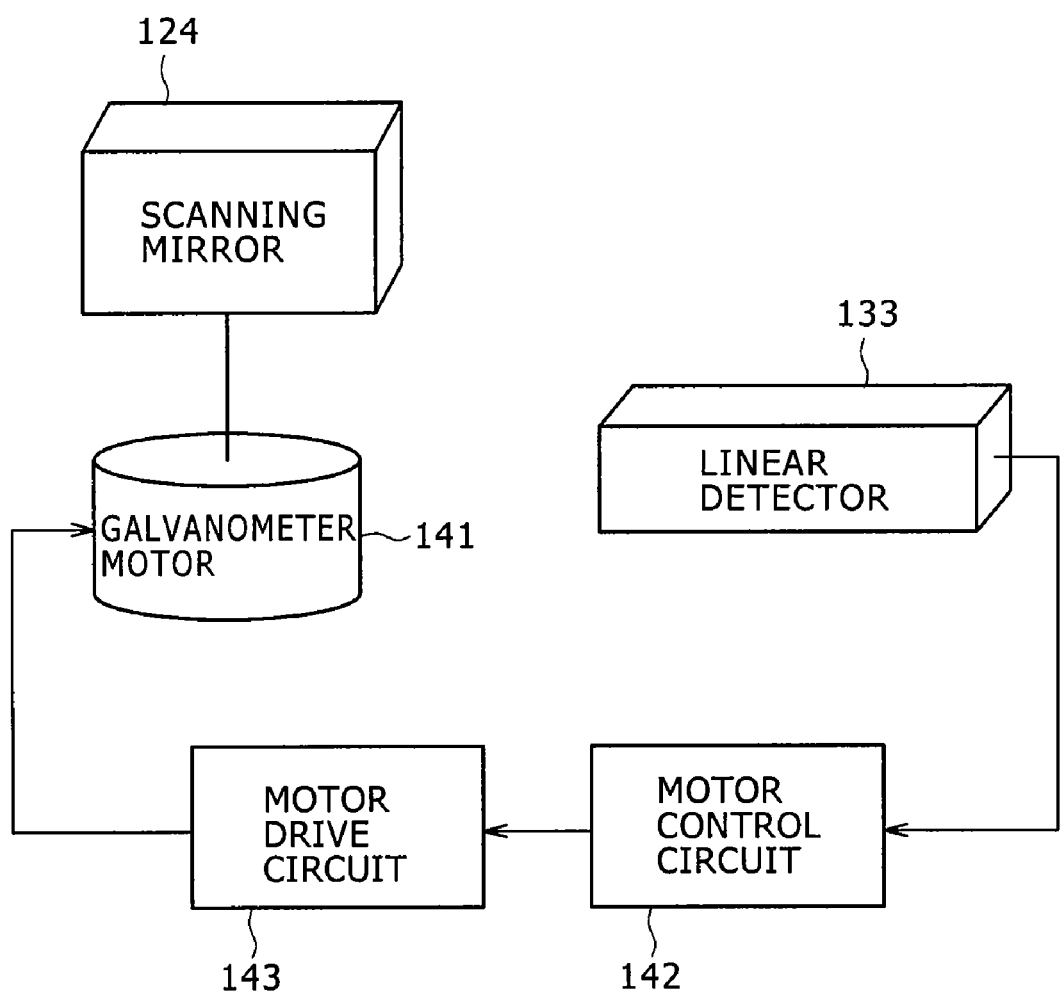
FIG. 9 is a block diagram of specific details of the light deflecting system shown in FIG. 7.

FIG. 9 shows in block form specific details of the light deflecting system 114 of the display apparatus 101.

As shown in FIG. 9, the light deflecting system 114 includes the scanning mirror 124, the linear detector 133, a galvanometer motor 141, a motor control circuit 142, and a motor driver circuit 143.

The galvanometer motor 141 is an actuator for angularly moving the scanning mirror 124. The galvanometer motor 141 angularly moves its shaft in a predetermined angular range. The galvanometer motor 141 reciprocally angularly moves its shaft in the angular range. The scanning mirror 124 is mounted on the shaft of the galvanometer motor 141. Consequently, when the shaft of the galvanometer motor 141 is angularly moved, the scanning mirror 124 is also angularly moved.

The linear detector 133 detects the position of the detection light beam applied thereto, and supplies a signal indicative of the detected position of the detection light beam to the motor control circuit 142.

The motor control circuit 142 supplies a control signal for controlling the energization of the galvanometer motor 141 to the motor driver circuit 143 based on the signal supplied from the linear detector 133 which is indicative of the detected position of the detection light beam.

For example, the motor control circuit 142 generates a control signal based on a synchronizing signal in synchronism with an image signal and the signal indicative of the position of the detection light beam, and supplies the generated control signal to the motor driver circuit 143. For example, if the display apparatus 101 displays a moving image on the screen 116, the motor control circuit 142 stores in advance the position of an image (the position of a detection light beam) produced by the projecting optical system 113 in a two-dimensional image as a target value in association with the time that elapses from the time when a picture starts being displayed to display the moving image. The motor control circuit 142 determines the time that elapses from the time when a picture starts being displayed based on the synchronizing signal. The motor control circuit 142 generates a control signal for energizing the galvanometer motor 141 depending on the difference between the position of the image as the target value associated with the determined elapsed time (the position of the detection light beam as the target value) and the detected position of the detection light beam which is indicated by the signal supplied from the linear detector 133.

For example, the motor control circuit 142 stores in advance the position of an image as a target value (the position of a detection light beam) in a two-dimensional image, for each period of time in which a row of pixels perpendicular to a scanning direction is displayed in the two-dimensional image that is produced by scanning operation. The motor control circuit 142 may alternatively store in advance the position of an image as a target value (the position of a detection light beam) in a two-dimensional image, for each period of time required to display a plurality of rows of pixels perpendicular to a scanning direction.

Furthermore, the motor control circuit 142 may generate a control signal for energizing the galvanometer motor 141 depending on a time-dependent change in the detected position of the detection light beam which is indicated by the signal supplied from the linear detector 133, i.e., depending on the difference between the scanning rate for the detection light beam and a stored target value for the scanning rate.

A deviation of the control signal depending on an error of the mounted position of the linear detector 133 is determined, and the mounted position of the linear detector 133 is adjusted or the value of the control signal generated by the motor control circuit 142 is adjusted in order to eliminate the deviation of the control signal.

Based on the control signal supplied from the motor control circuit 142, the motor driver circuit 143 supplies a drive current to the galvanometer motor 141 to energize the galvanometer motor 141.

As described above, the light deflecting system 114 angularly moves the scanning mirror 124 based on the position of the detection light beam that is detected by the linear detector 133.

The scanning mirror 124 is not limited to a galvanometer mirror, but may include a polygon mirror, a polygon prism, or the like. If the scanning mirror 124 includes a polygon mirror, a polygon prism, or the like, then the galvanometer motor 141 is replaced with a constant-speed motor for rotating its own shaft to rotate the polygon mirror, the polygon prism, or the like at a substantially constant speed.

An angular movement control process of the display apparatus 101 will be described below with reference to FIG. 10.

In step S11, the mirror angle detecting light source 131 of the detection light irradiator 114a emits a detection light beam. The detection light beam emitted from the mirror angle detecting light source 131 is applied to the projecting optical system 113. The detection light beam is reflected back and forth by the main mirror 122 and the auxiliary mirror 123, and applied to the scanning mirror 124 of the light deflector 114b.

In step S12, the light deflecting system 114 starts scanning the detection light beam. Specifically, the scanning mirror 124 starts moving angularly in a predetermined angular range about a given axis for reflecting and scanning the detection light beam emitted from the mirror angle detecting light source 131. The detection light beam reflected by the scanning mirror 124 is applied to the linear detector 133.

The scanning mirror 124 reflects and scans the light beam modulated by the light modulator 112, and also reflects and scans the detection light beam emitted from the mirror angle detecting light source 131. Since the scanning mirror 124 simultaneously reflects and scans the modulated light beam and the detection light beam, the position at which the detection light beam reflected by the scanning mirror 124 is applied to the linear detector 133 is the same as the position at which the modulated light beam is scanned and reflected by the scanning mirror 124 on a coordinate axis that is aligned with the direction in which the modulated light beam and the detection light beam are scanned.

In step S13, the linear detector 133 detects the position in which the detection light beam is applied. Specifically, the linear detector 133 detects the position of the detection light beam reflected by the scanning mirror 124 thereby to detect the position of the projected image that is produced by the projecting optical system 113 and scanned by the scanning mirror 124. The linear detector 133 supplies a signal indicative of the detected position of the detection light beam to the motor control circuit 142. The signal supplied to the motor control circuit 142 represents the position of the projected image produced by the projecting optical system 113.

In step S14, the motor control circuit 142 generates a control signal for controlling the energization of the galvanometer motor 141 based on the position in which the detection light beam is applied. Stated otherwise, the motor control circuit 142 generates a control signal based on the signal supplied from the linear detector 133 which is representative of the position in which the detection light beam is applied. The motor control circuit 142 supplies the generated control signal to the motor driver circuit 143.

In step S15, the motor driver circuit 143 generates a current for energizing the galvanometer motor 141 based on the control signal supplied from the motor control circuit 142, and supplies the current to the galvanometer motor 141, thereby energizing the galvanometer motor 141. Then, control goes back to step S13, and the processing sequence from step S13 is repeated.

According to an embodiment, as described above, the position of the scanned projected image is detected and the scanning of the projected image is controlled based on the detected position of the projected image. Since the position of the scanned projected image, rather than the angle of the scanning mirror 124, is detected, it is easy to control the scanning of the projected image so as to scan the projected image at a constant rate.

Figure 11:
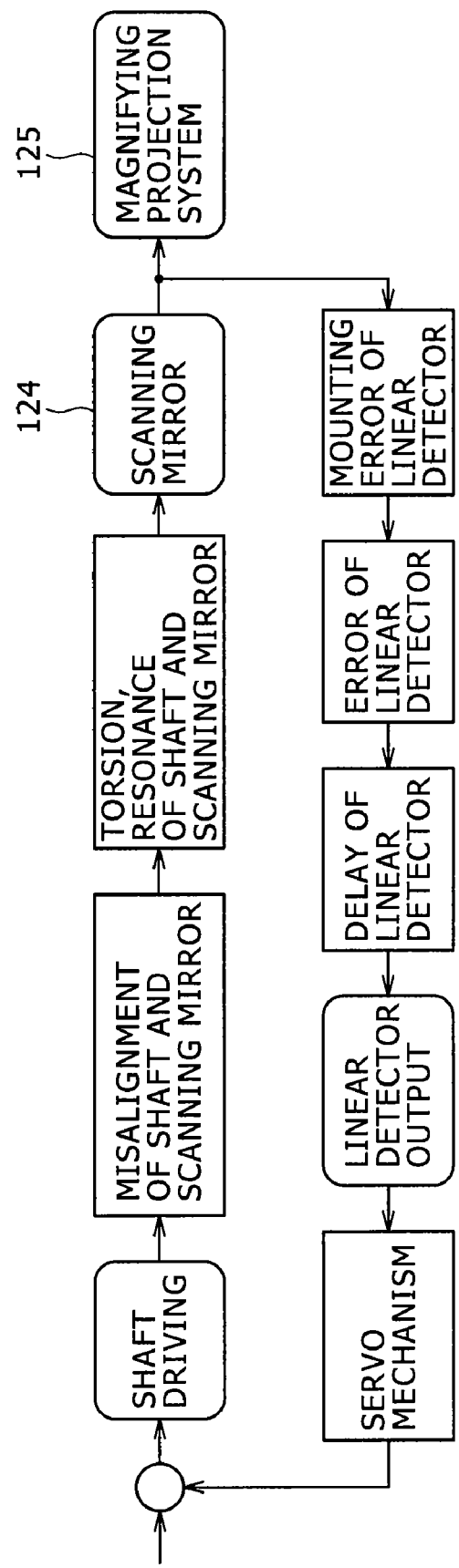
FIG. 11 is a block diagram showing factors for producing errors between an image projected by the display apparatus shown in FIG. 6 onto a screen and the angular movement control process.

FIG. 11 shows in block form factors for producing errors between an image projected by the display apparatus 101 onto the screen 116 and the angular movement control process.

Since the scanning mirror 124 is mounted on the shaft of the galvanometer motor 141, a difference (error) is developed between the angle of the shaft of the galvanometer motor 141 and the angle of the scanning mirror 124 due to a misalignment between the shaft of the galvanometer motor 141 and the scanning mirror 124. A difference (error) is also developed between the angle of the shaft of the galvanometer motor 141 and the angle of the scanning mirror 124 because of a torsion and resonance of the shaft of the galvanometer motor 141 and the scanning mirror 124.

Specifically, the scanning mirror 124 scans an image projected from the projecting optical system 113 at an angle which is different (due to an error) from the angle of the shaft of the galvanometer motor 141, thereby forming a two-dimensional image, and applies the formed two-dimensional image to the magnifying projection system entrance unit 115.

That is, an image that is affected by an error which is developed between the angle of the shaft of the galvanometer motor 141 and the angle of the scanning mirror 124 due to a misalignment, torsion, and resonance of the shaft of the galvanometer motor 141 and the scanning mirror 124, is projected by the magnifying projection system 115 onto the screen 116.

As with the image projected through the magnifying projection system entrance unit 125 onto the screen 116, the detection light beam is also affected by an error relative to the angle of the shaft of the galvanometer motor 141 due to a misalignment, torsion, and resonance of the shaft of the galvanometer motor 141 and the scanning mirror 124.

A similar problem exists with respect to the control loop for controlling the galvanometer motor 141, i.e., the linear detector 133, the motor control circuit 142, and the motor driver circuit 143. The detection light beam which is affected by the same error as with the image projected through the magnifying projection system entrance unit 125 onto the screen 116 is applied to the linear detector 133.

The position of the detection light beam detected by the linear detector 133 contains an error of the linear detector 133 and a mounting error thereof.

In addition, when the position where the light is applied is detected by the linear detector 133, a certain period of time needs to be consumed before the linear detector 133 detects and outputs a signal representing the detected position. Therefore, when the linear detector 133 detects a position, a certain time delay exists before the linear detector 133 actually outputs a signal representing the detected position.

As described above, the signal output from the linear detector 133 contains errors with respect to the angle of the shaft of the galvanometer motor 141 due to the misalignment, torsion, and resonance of the shaft of the galvanometer motor 141 and the shaft of the scanning mirror 124, the error of the linear detector 133 itself and the mounting error thereof, and the error due to the time delay of the output signal from the linear detector 133.

A servo mechanism including the galvanometer motor 141, the motor control circuit 142, and the motor driver circuit 143 controls the angle of the shaft of the galvanometer motor 141 based on the signal, including the above errors, from the linear detector 133.

The detection light beam applied to the linear detector 133 contains the same errors as those caused by the misalignment, torsion, and resonance of the shaft of the galvanometer motor 141 and the scanning mirror 124, which errors affect the image projected through the magnifying projection system entrance unit 125 onto the screen 116. Therefore, as viewed from the image projected through the magnifying projection system entrance unit 125 onto the screen 116, the errors caused by the misalignment, torsion, and resonance of the shaft of the galvanometer motor 141 and the scanning mirror 124 can be ignored in a servo mechanism including the linear detector 133, the motor control circuit 142, and the motor driver circuit 143.

Specifically, in the display apparatus 101 according to the present invention, the servo mechanism including the linear detector 133, the motor control circuit 142, and the motor driver circuit 143 is not affected by the misalignment, torsion, and resonance of the shaft of the galvanometer motor 141 and the scanning mirror 124. As viewed from the image projected through the magnifying projection system entrance unit 125 onto the screen 116, the control process performed by the servo mechanism is affected only by the error of the linear detector 133 and the mounting error thereof, and the error due to the time delay of the output signal from the linear detector 133.

According to an embodiment, therefore, the display apparatus 101 has a smaller number of factors for errors which affect the control process than the conventional display apparatus, and hence can control the display of images more accurately.

A comparison between the display apparatus according to an embodiment invention and the conventional display apparatus will be described below.

The conventional rotary encoder used for detecting the angle of the scanning mirror generally had a diameter of about 30 mm. With the rotary encoder having a diameter of 30 mm, the rotary encoder has a circumferential length of 30× it, which is about 90 mm. If the scanning mirror is angularly movable in an angular range of 18 degrees, then the portion of the circumferential length of the rotary encoder which corresponds to the angular range of 18 degrees is determined as 90×18÷360, which is 4.5 mm. Consequently, the conventional rotary encoder detects an angle of the shaft in divisions of the length of 4.5 mm.

The two-dimensional image applied to the magnifying projection system entrance unit 125 may have a horizontal width of about 30 mm.

If the conventional rotary encoder detects an angle of the shaft in 5000 divisions of the length of 4.5 mm, then one 5000th of 4.5 mm is calculated as 4.5 mm/5000=0.0009 mm. If the detecting width of the linear detector 133 is 30 mm which is the same as the horizontal width of the two-dimensional image applied to the magnifying projection system entrance unit 125, and if the linear detector 133 detects a position in 5000 divisions of the width of 30 mm, then one 5000th of 30 mm is calculated as 30 mm/5000=0.006 mm, which is more than 6 times as long as the one 5000th of 4.5 mm of the conventional rotary encoder. Accordingly, the linear detector 133 can detect a position more accurately than the conventional rotary encoder.

As a result, the display apparatus 101 according to the present invention can control the display of images more accurately.

The linear detector 133 is more inexpensive than the rotary encoder. If the linear detector 133 is required to have the same resolution as the conventional rotary encoder, then the resolution of the linear detector 133 is lowered, and the linear detector 133 is much more inexpensive than the rotary encoder.

The display apparatus 101 according to the present invention is, therefore, more inexpensive than the conventional display apparatus.

It may be proposed to increase the diameter of the conventional rotary encoder. Though the rotary encoder with the increased diameter is capable of detecting an angle more accurately, its moment of inertia is also increased, making it difficult for the rotary encoder to control the angle thereof. As a result, the general accuracy of angle control may not be improved.

According to an embodiment, the horizontal width of the two-dimensional image applied to the magnifying projection system entrance unit 125 may be increased and the width of the linear detector 133 may be increased for improved accuracy. Since the moment of inertia of the scanning mirror 124 and the shaft of the galvanometer motor 141 remains unchanged, the general accuracy of angle control may be improved.

According to an embodiment, since the display apparatus does not require a rotary encoder for angular movement in unison with the scanning mirror 124, the moment of inertia of the scanning mirror 124 and the shaft of the galvanometer motor 141 may be smaller than the corresponding moment of inertia in the conventional display apparatus. Consequently, the scanning mirror 124 can be operated with a smaller force, and the angular velocity of the scanning mirror 124 can be changed with a smaller force, so that the angular position of the scanning mirror 124 can be controlled more easily.

A display apparatus according to another embodiment will be described below with reference to FIGS. 12 to 17.

Those parts of the display apparatus shown in FIGS. 12 to 17 which are identical to those of the display apparatus shown in FIGS. 6 to 11 are denoted by identical reference characters, and will not be described in detail below.

Figure 12:
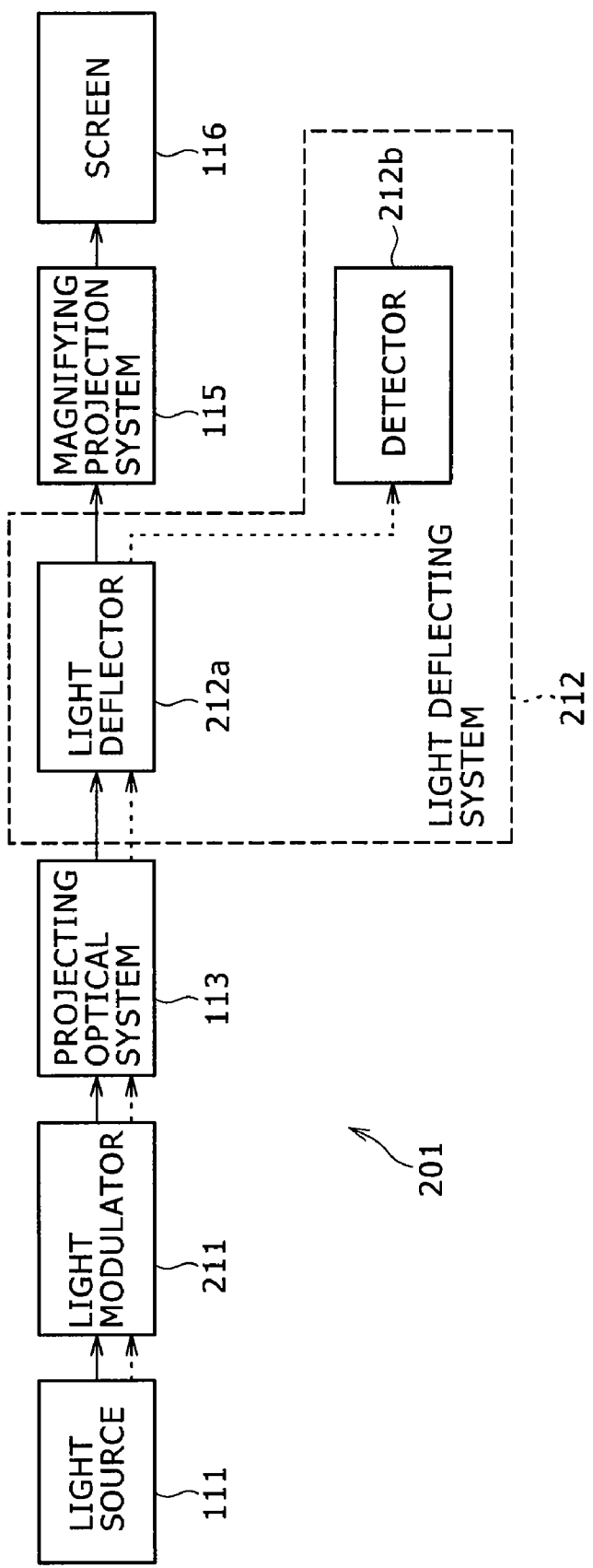
FIG. 12 is a block diagram of a display apparatus according to another embodiment.

FIG. 12 shows in block form a display apparatus 201 according to the other embodiment of the present invention. As shown in FIG. 12, the display apparatus 201 has a light source 111, a projecting optical system 113, a magnifying projection system 115, a light modulator 211, and a light deflecting system 212. The light deflecting system 212 includes a light deflector 212a and a detector 212b. The display apparatus 201 projects image light onto a screen 116 to display an image on the screen 116.

The screen 116 may be positioned outside of the display apparatus 201 or may be integral with the display apparatus 201.

The light modulator 211 modulates the laser beam emitted from the light source 111. Specifically, the light modulator 211 modulates the laser beam emitted from the light source 111 with an image signal that is supplied to the light modulator 211 to form bright and dark image areas.

The light modulator 211 reflects the light beam from the light source 111 as a detection light beam, separately from the light beam for displaying images, and applies the detection light beam to the projecting optical system 113. Stated otherwise, the light modulator 211 reflects the light beam from the light source 111 as a detection light beam, separately from the modulated light beam, and applies the detection light beam, different from the modulated light beam, to the projecting optical system 113.

If the light modulator 211 includes a GLV, then the GLV includes a phase reflection diffraction grating for modulating a light beam for displaying images and an additional phase reflection diffraction grating for reflecting a light beam from the light source 111 as a detection light beam. The GLV as the light modulator 211 will be described in detail later on.

The light modulator 212a generates a two-dimensional image by scanning the modulated light beam applied from the light modulator 211 through the projecting optical system 113. Specifically, the light deflector 212a generates a two-dimensional image by scanning the image formed by the projecting optical system 113 in a direction perpendicular to a longitudinal direction of the image formed by the projecting optical system 113.

The light deflector 212a reflects and scans the detection light beam as it has been applied (reflected) from the light modulator 211 and passed through the projecting optical system 113, as with the modulated light beam from the light modulator 211. The detector 212b detects the position of the scanned detection light beam, thereby detecting the position of the image formed by the projecting optical system 113 in the two-dimensional image.

The two-dimensional image produced through the light deflecting system 212 is magnified and projected by the magnifying projection system 115 onto the screen 116.

Figure 13:
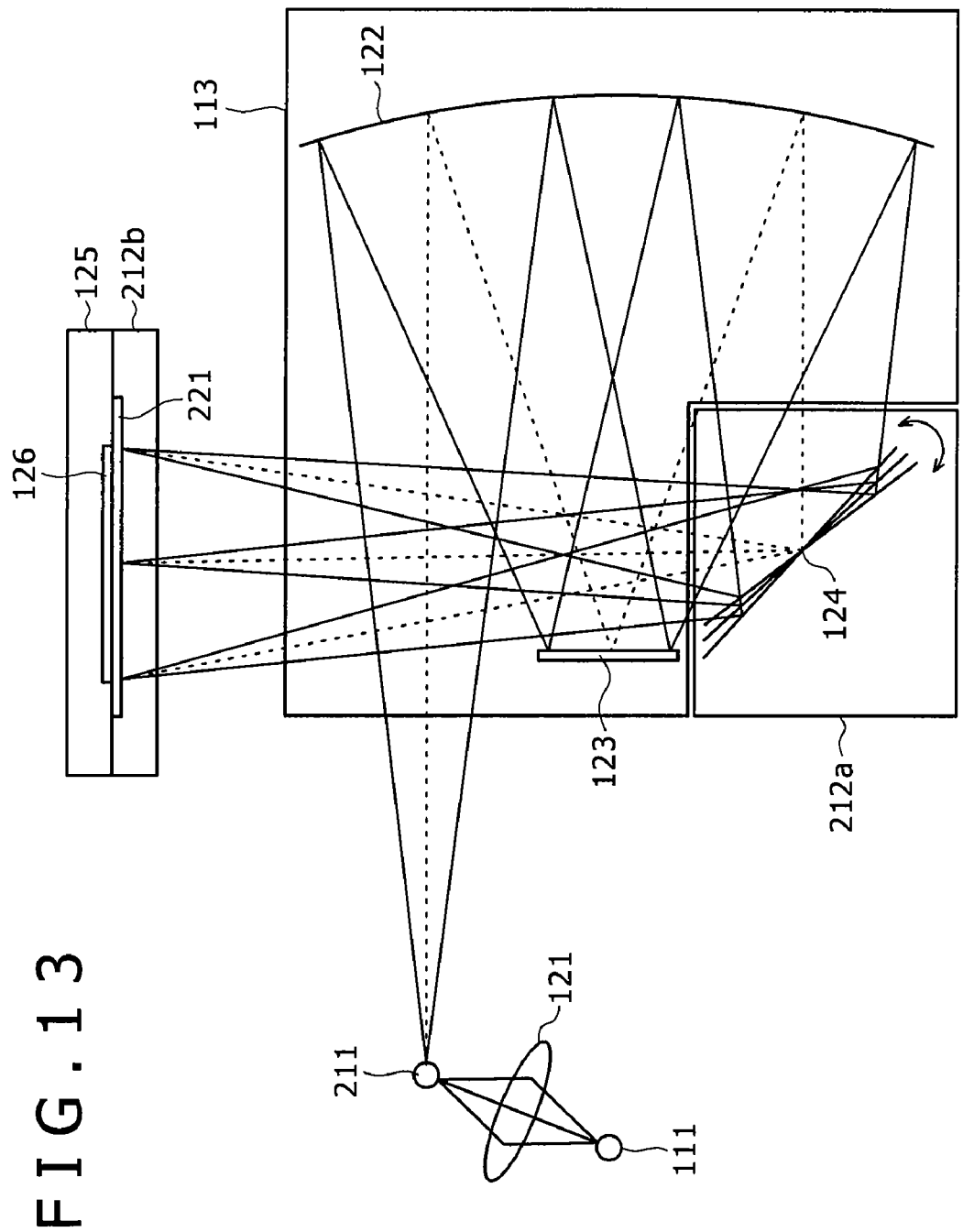
FIG. 13 is a schematic plan view of a light source, a projecting optical system, a magnifying projection system, a light modulator, and a light deflecting system of the display apparatus shown in FIG. 12.
Figure 14:
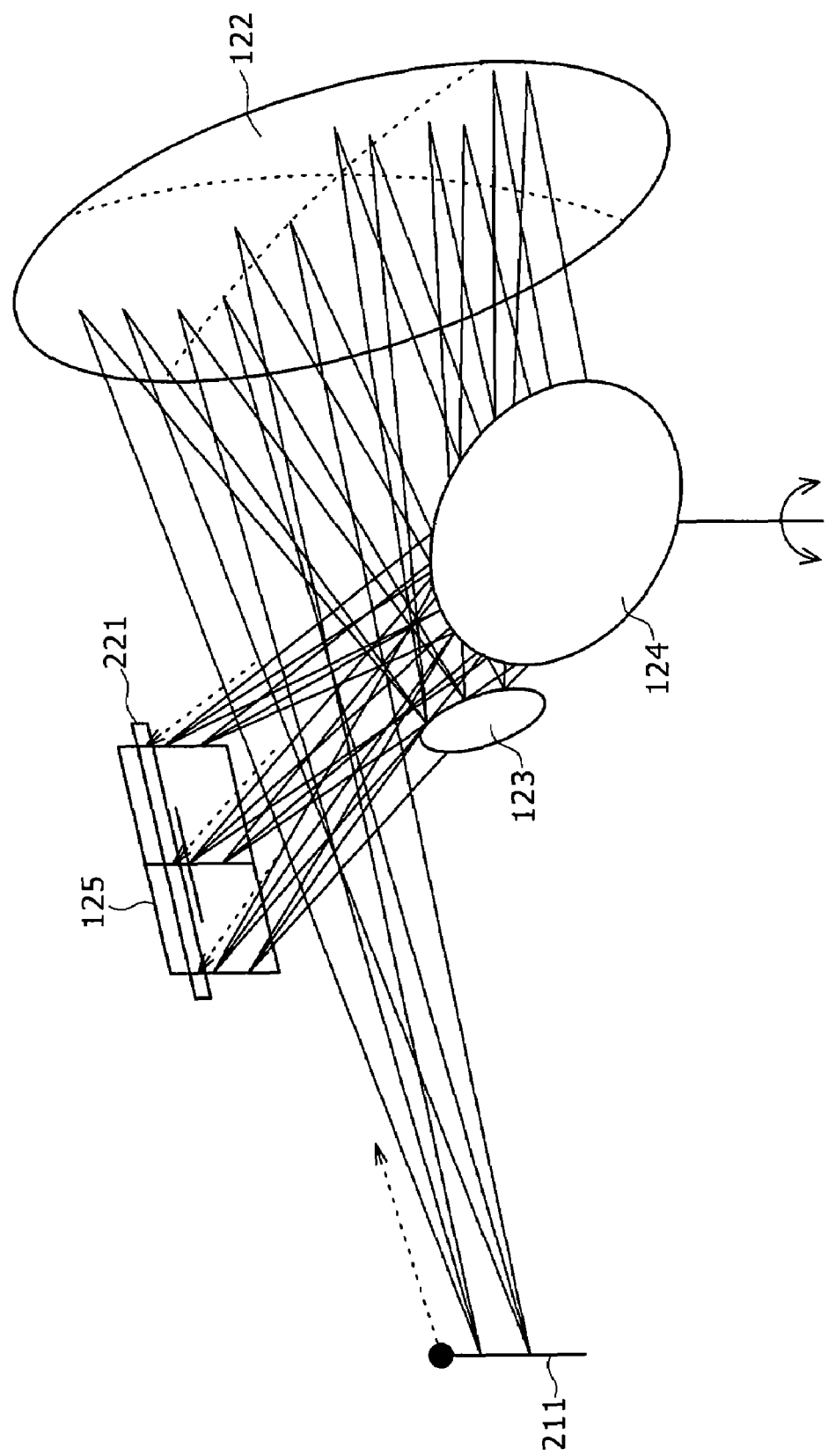
FIG. 14 is a schematic perspective view showing light paths in the projecting optical system, the magnifying projection system, the light modulator, and the light deflecting system shown in FIG. 13.

FIG. 13 schematically shows the light source 111, the projecting optical system 113, a magnifying projection system entrance unit 125 which is an entrance unit of the magnifying projection system 115, the light modulator 211, and the light deflecting system 212. FIG. 14 schematically shows light paths in the projecting optical system 113, the magnifying projection system entrance unit 125, the light modulator 211, and the light deflecting system 212.

As shown in FIGS. 13 and 14, the light deflecting system 212 includes the light deflector 212a and the detector 212b. The light deflector 212a forms a two-dimensional image 126 by scanning the modulated light beam that is applied from the light modulator 211 through the projecting optical system 113. The light deflector 212a also scans the detection light beam that has passed through the projecting optical system 113. The detector 212b detects the position of the scanned detection light beam.

The light beam condensed by the condensing optical system 121 is applied to the light modulator 211. The light modulator 211 includes a GLV. As described above, the GLV includes an array of light modulating elements in the form of microscopic ribbons disposed on a silicon substrate. When an electric signal is applied to each of the light modulating elements of the GLV, the light modulating element is moved a small distance. A light beam applied to the light modulator 211 produces bright and dark image areas depending on the amount of diffraction of the light beam, and is reflected by the light modulator 211. Another light modulator in the form of a GLV is also provided separately from the light modulator for modulating the light beam for displaying images. The other light modulator reflects a light beam condensed by the condensing optical system 121 as a detection light beam.

The detection light beam and the modulated light beam are applied to the projecting optical system 113.

The light deflector 212a has a scanning mirror 124. The scanning mirror 124 reflects and scans the light beam that has been modulated by the light modulator 211 and applied through the projecting optical system 113.

The scanning mirror 124 reflects and scans the light beam that has been modulated by the light modulator 211, and also reflects and scans the detection light beam applied from the light modulator 211 through the projecting optical system 113. Thus, the detection light beam is reflected and scanned in the same manner as the projected image produced by the projecting optical system 113. The deflection light beam that is reflected by the scanning mirror 124 is applied to the detector 212b.

The detector 212b has a linear detector 221.

Since the scanning mirror 124 reflects and scans the modulated light beam from the light modulator 211, and also reflects and scans the detection light beam, the position of the projected image produced by the projecting optical system 113 can be known from the position of the detection light beam reflected by the scanning mirror 124. Specifically, the linear detector 221 detects the position of the projected image produced by the projecting optical system 113 by detecting the position of the detection light beam reflected by the scanning mirror 124.

The linear detector 221 outputs a signal representative of the detected position of the detection light beam. Stated otherwise, the signal output from the linear detector 221 indicates the position of the projected image produced by the projecting optical system 113.

The linear detector 221 may not be a single unitary photosensor, but may include a plurality of photosensors.

Figure 15:
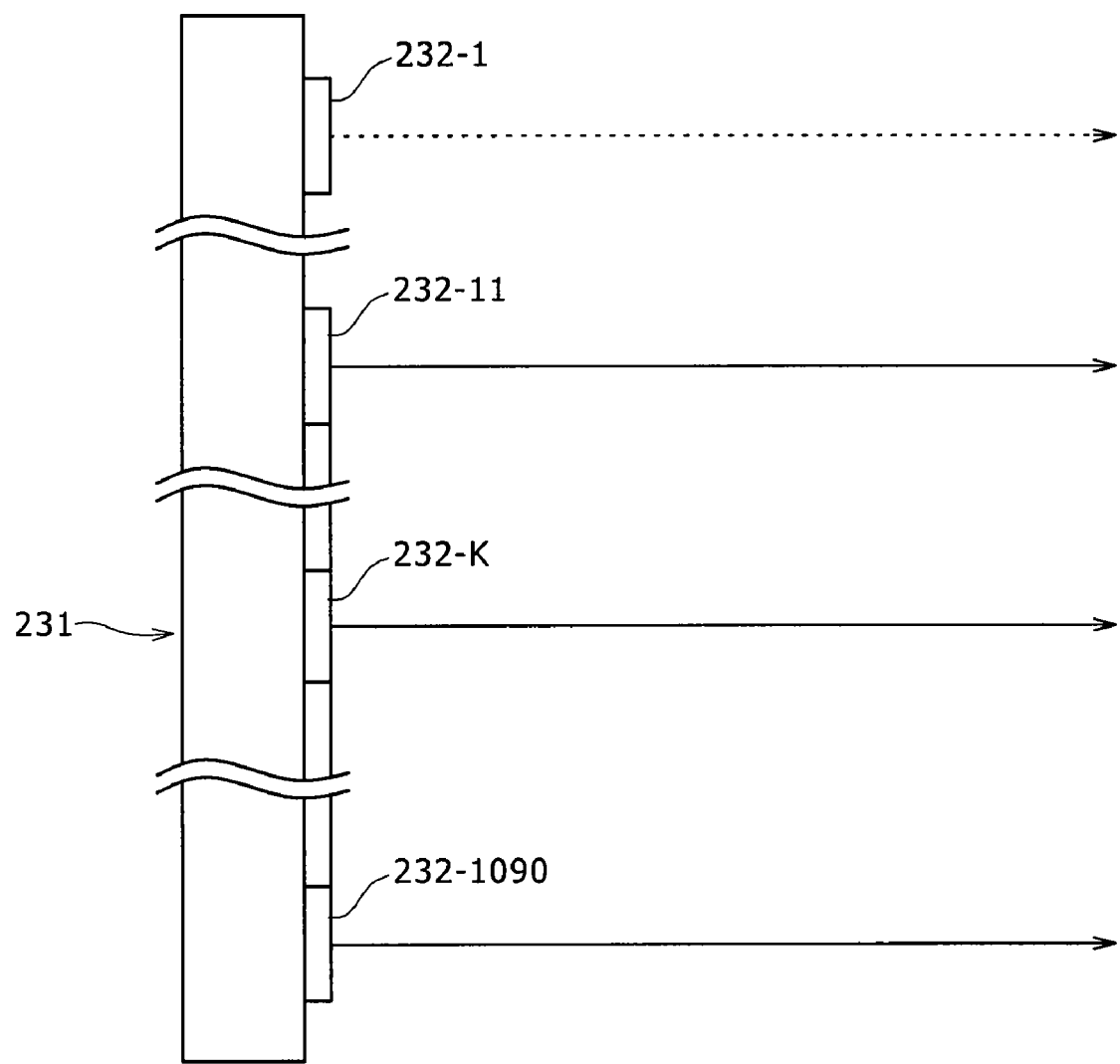
FIG. 15 is a fragmentary side elevational view of a GLV (Grating Light Valve) as an example of the light modulator.

FIG. 15 shows in fragmentary side elevation a GLV 231 as an example of the light modulator 211. The GLV 231 has a modulating element 232-1 including a phase reflection diffraction grating for reflecting the light beam from the light source 111 as a detection light beam and a plurality of modulating elements 232-11 to 232-1090 including phase reflection diffraction gratings for modulating a light beam for displaying images.

Therefore, the GLV 231 includes the modulating element 232-1 for reflecting the light beam from the light source 111 as a detection light beam and the modulating elements 232-11 to 232-1090 for modulating a light beam for displaying images.

The modulating element 232-1 and the modulating elements 232-11 to 232-1090 should preferably be spaced a predetermined distance from each other to prevent the detection light beam reflected and applied by the modulating element 232-1 from obstructing images that are produced.

The detection light beam is thus produced and applied without the need for another light source for emitting such a detection light beam separately from the light source 111. Consequently, the display apparatus 201 according to the other embodiment of the present invention is relatively simple in structure.

Figure 16:
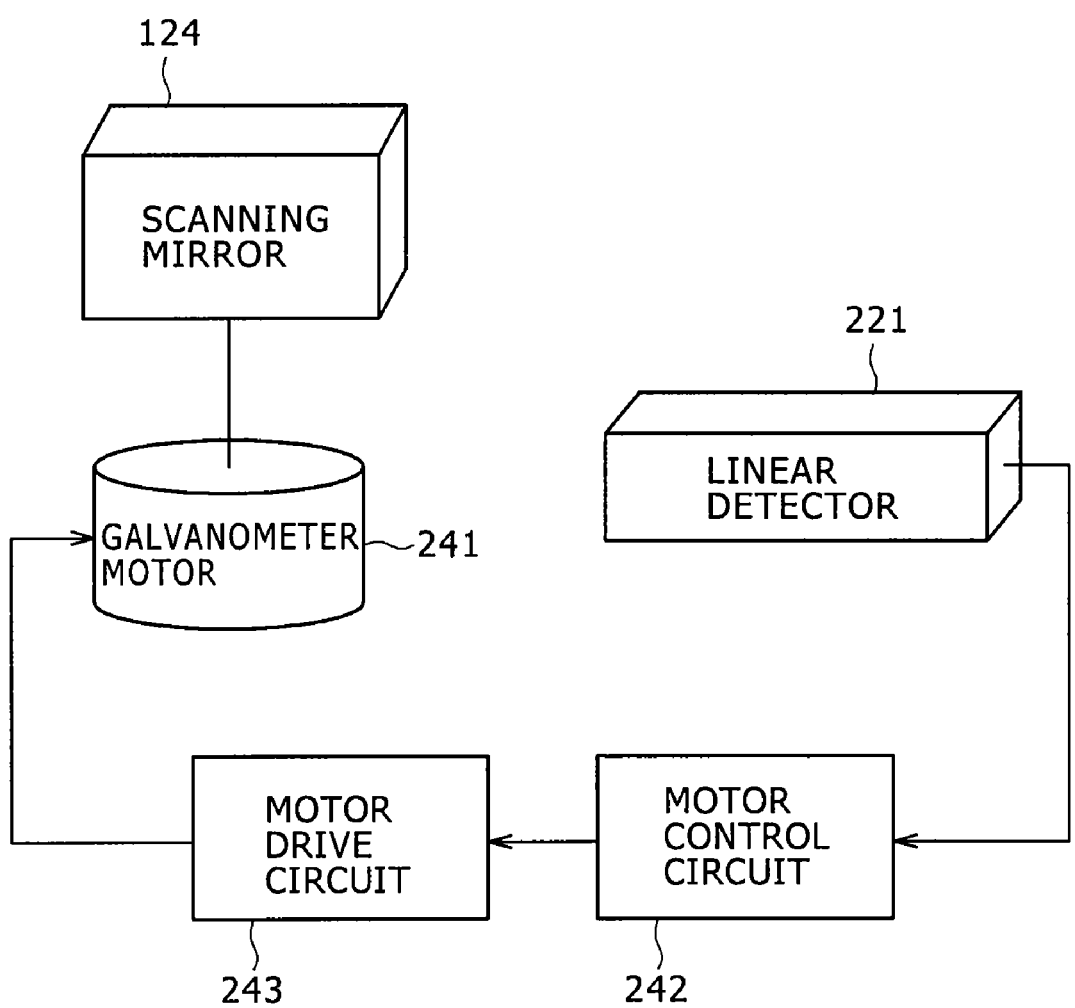
FIG. 16 is a block diagram of specific details of the light deflecting system shown in FIG. 13.

FIG. 16 shows in block form specific details of the light deflecting system 212 of the display apparatus 201.

As shown in FIG. 16, the light deflecting system 212 includes the scanning mirror 124, a galvanometer motor 241, the linear detector 221, a motor control circuit 242, and a motor driver circuit 243.

The galvanometer motor 241 is an actuator for angularly moving the scanning mirror 124. The galvanometer motor 241 angularly moves its shaft in a predetermined angular range such that the direction of movement of the shaft changes at the ends of the angular range.

The linear detector 221 detects the position of the detection light beam applied thereto, and supplies a signal indicative of the detected position of the detection light beam to the motor control circuit 242.

The motor control circuit 242 supplies a control signal for controlling the energization of the galvanometer motor 241 to the motor driver circuit 243 based on the signal supplied from the linear detector 221 which is indicative of the detected position of the detection light beam.

The motor driver circuit 243 supplies a current for energizing the galvanometer motor 241 to the galvanometer motor 241, thereby energizing the galvanometer motor 241, based on the control signal supplied from the motor control circuit 242.

As described above, the light deflecting system 212 angularly moves the scanning mirror 124 based on the position of the detection light beam that is detected by the linear detector 221.

Figure 17:
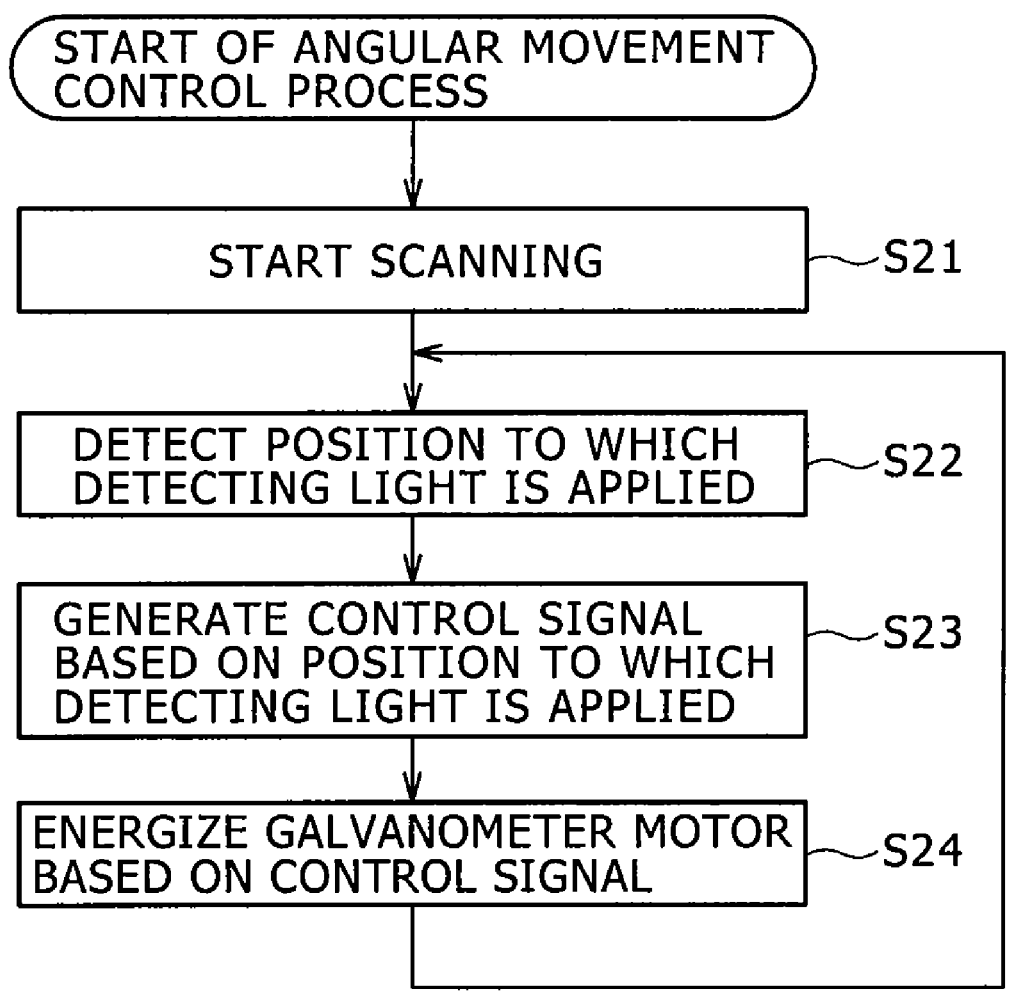
FIG. 17 is a flowchart of an angular movement control process of the display apparatus shown in FIG. 12.

An angular movement control process of the display apparatus 201 will be described below with reference to FIG. 17.

In step S21, the light deflecting system 212 starts scanning the detection light beam. Specifically, the scanning mirror 124 starts moving angularly in a predetermined angular range about a given axis for reflecting and scanning the detection light beam applied from the light modulator 211. The detection light beam reflected by the scanning mirror 124 is applied to the linear detector 221.

In step S22, the linear detector 221 detects the position in which the detection light beam is applied. Specifically, the linear detector 221 detects the position of the detection light beam reflected by the scanning mirror 124 thereby to detect the position of the projected image that is produced by the projecting optical system 113 and scanned by the scanning mirror 124. The linear detector 221 supplies a signal indicative of the detected position of the detection light beam to the motor control circuit 242. The signal supplied to the motor control circuit 242 represents the position of the projected image produced by the projecting optical system 113.

In step S23, the motor control circuit 242 generates a control signal for controlling the energization of the galvanometer motor 241 based on the position in which the detection light beam is applied. Stated otherwise, the motor control circuit 242 generates a control signal based on the signal supplied from the linear detector 221 which is representative of the position in which the detection light beam is applied. The motor control circuit 242 supplies the generated control signal to the motor driver circuit 243.

In step S24, the motor driver circuit 243 generates a current for energizing the galvanometer motor 241 based on the control signal supplied from the motor control circuit 242, and supplies the current to the galvanometer motor 241, thereby energizing the galvanometer motor 241. Then, control goes back to step S22, and the processing sequence from step S23 is repeated.

A display apparatus according to an embodiment will be described below with reference to FIGS. 18 to 20.

Those parts of the display apparatus shown in FIGS. 18 to 20 which are identical to those of the display apparatus shown in FIGS. 6 to 11 are denoted by identical reference characters, and will not be described in detail below.

Figure 18:
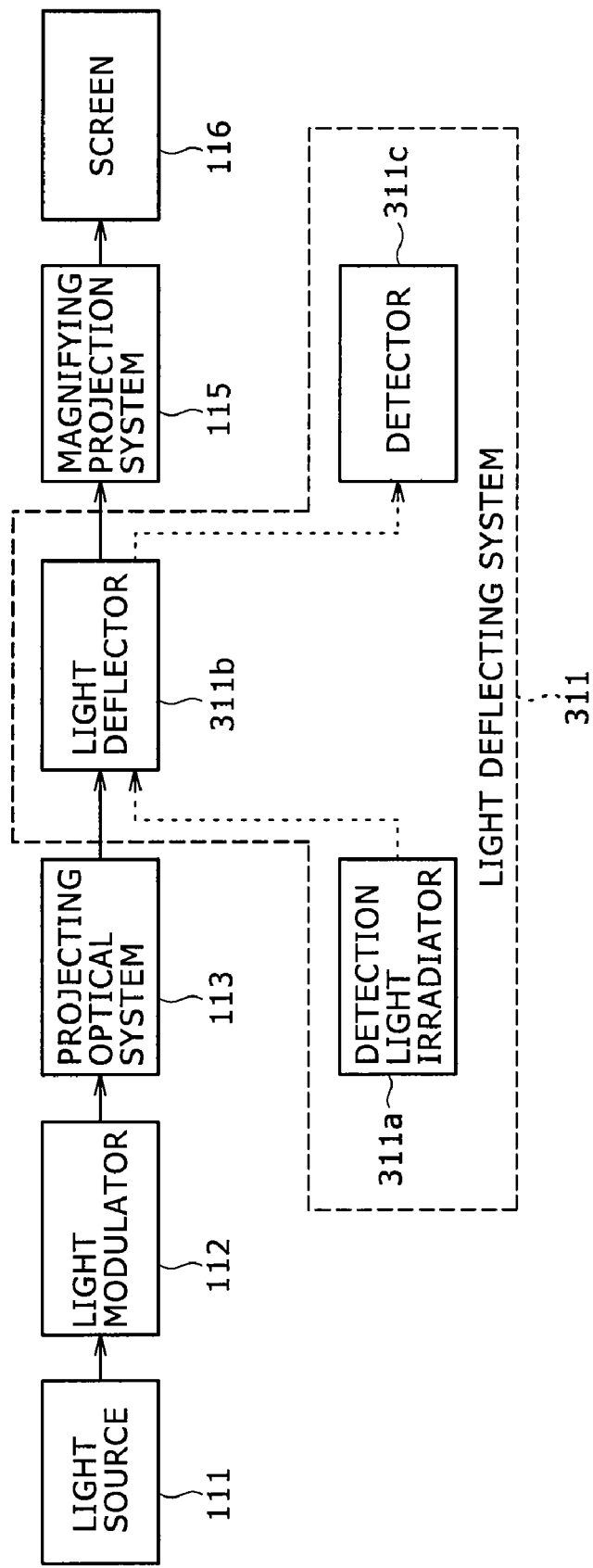
FIG. 18 is a block diagram of a display apparatus according to still another embodiment.

FIG. 18 shows in block form a display apparatus 301 according to the embodiment. As shown in FIG. 18, the display apparatus 301 has a light source 111, a light modulator 112, a projecting optical system 113, a magnifying projection system 115, and a light deflecting system 311. The light deflecting system 311 includes a detection light irradiator 311a, a light deflector 311b, and a detector 311c. The display apparatus 301 projects image light onto a screen 116 to display an image on the screen 116.

The screen 116 may be positioned outside of the display apparatus 301 or may be integral with the display apparatus 301.

The light deflector 311b generates a two-dimensional image by scanning the modulated light beam applied from the light modulator 112 through the projecting optical system 113. Specifically, the light deflector 311b generates a two-dimensional image by scanning the image formed by the projecting optical system 113 in a direction perpendicular to a longitudinal direction of the image formed by the projecting optical system 113.

The detection light irradiator 311a emits a detection light beam for detecting the position of the image formed by the projecting optical system 113 in the two-dimensional image. The light deflector 311b scans the detection light beam. The detector 311c detects the position of the scanned detection light beam, thereby detecting the position of the image formed by the projecting optical system 113 in the two-dimensional image. The detection light beam passes along a path indicated by the dotted lines in FIG. 18.

The two-dimensional image produced by the light deflecting system 311 is magnified and projected by the magnifying projection system 115 onto the screen 116. Specifically, the magnifying projection system 115 magnifies and projects the two-dimensional image, which is produced as an intermediate image by the light modulator 112 and the light deflecting system 311, onto the screen 16.

Figure 19:
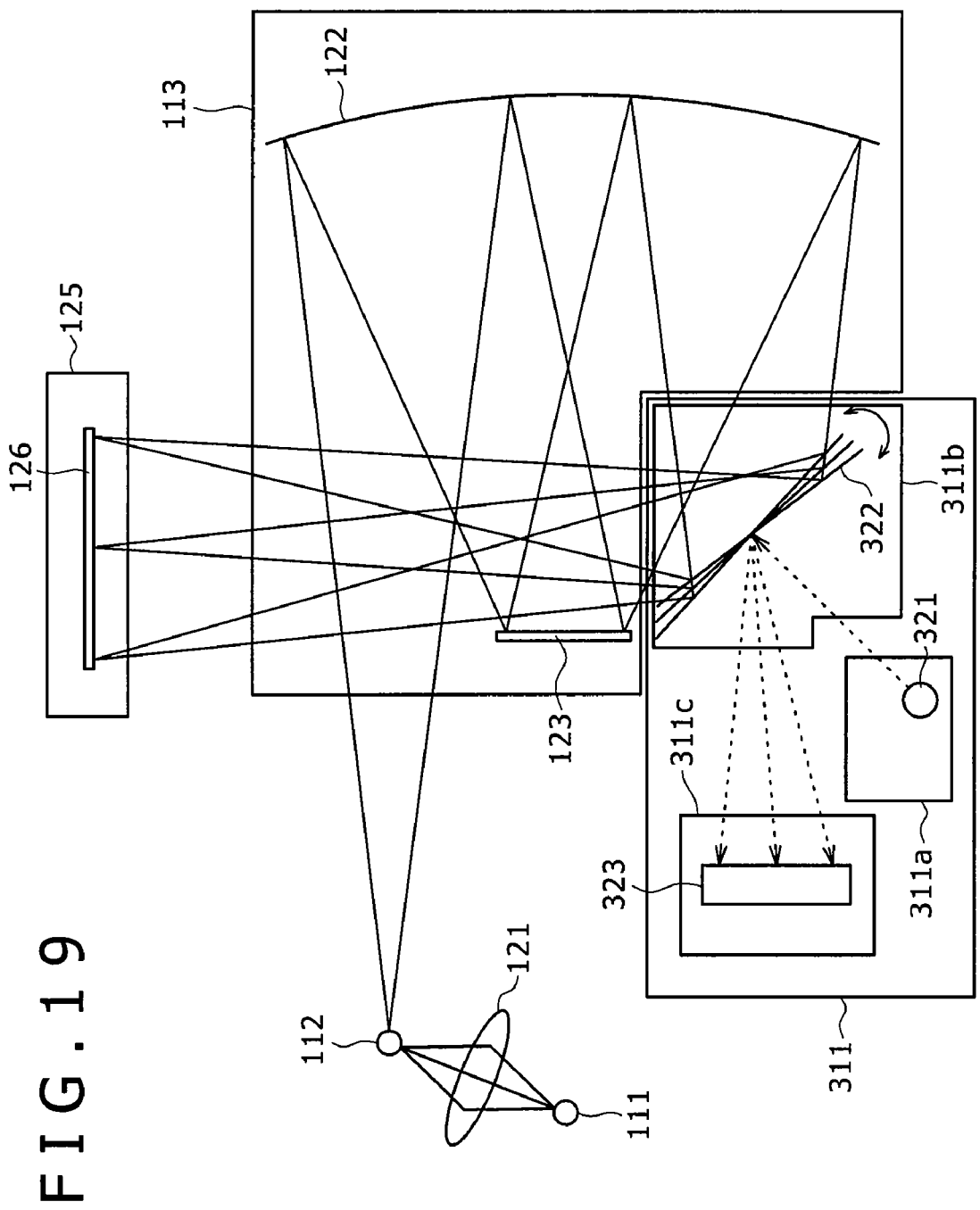
FIG. 19 is a schematic plan view of a light source, a light modulator, a projecting optical system, a magnifying projection system, and a light deflecting system of the display apparatus shown in FIG. 18.

FIG. 19 schematically shows the light source 111, the light modulator 112, the projecting optical system 113, a magnifying projection system entrance unit 125 which is an entrance unit of the magnifying projection system 115, the light deflecting system 311. FIG. 20 schematically shows light paths in the light modulator 112, the projecting optical system 113, the magnifying projection system entrance unit 125, and the light deflecting system 311.

Figure 20:
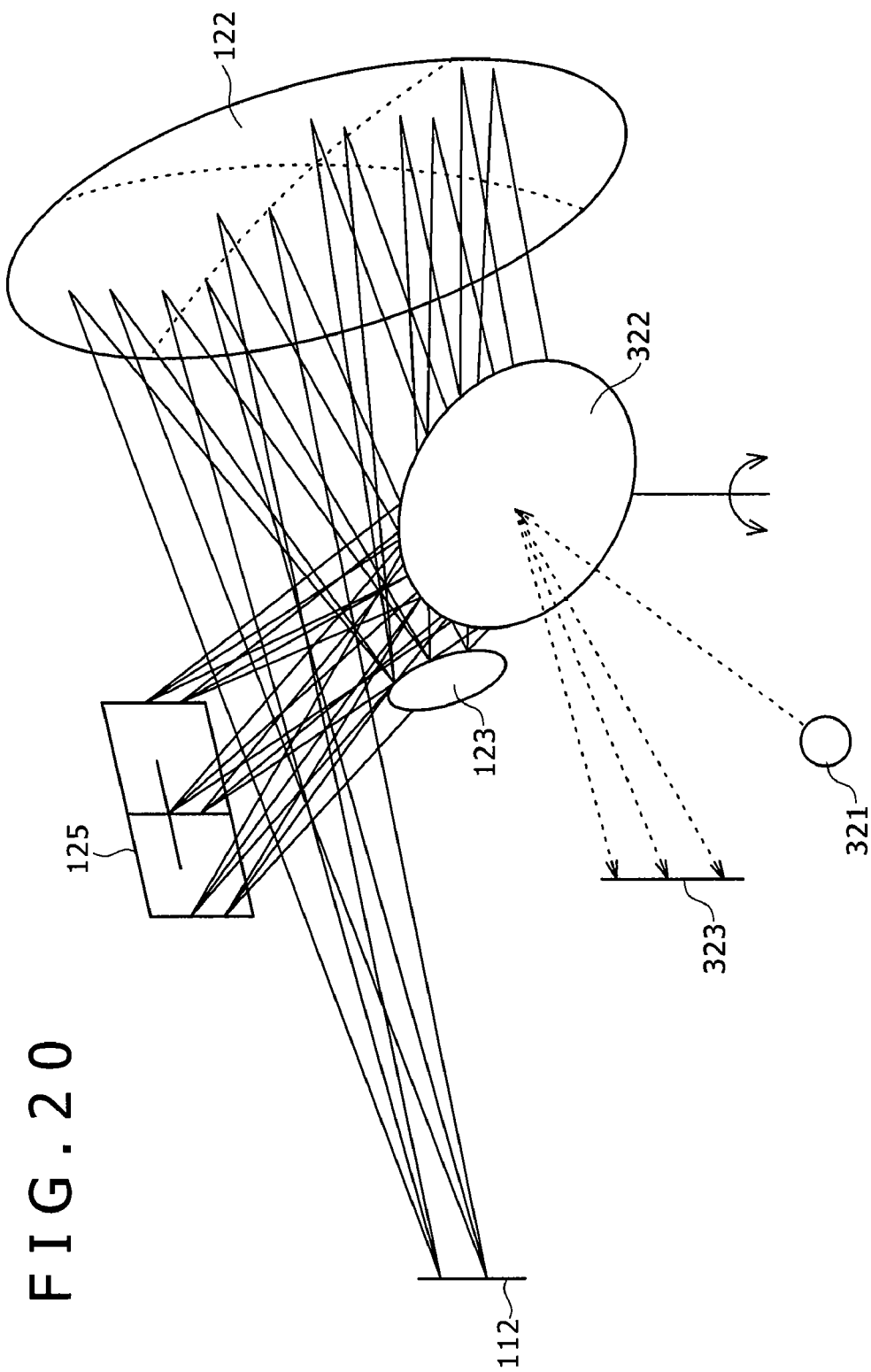
FIG. 20 is a schematic perspective view showing light paths in the light modulator, the projecting optical system, the magnifying projection system, and the light deflecting system shown in FIG. 19.

As shown in FIGS. 19 and 20, the light deflecting system 311 includes the detection light irradiator 311a, the light deflector 311b, and the detector 311c. The light deflector 311b forms a two-dimensional image 126 by scanning the modulated light beam that is applied from the light modulator 112 through the projecting optical system 113. The detection light irradiator 311a emits a detection light beam, the light deflector 311b scans the detection light beam, and the detector 311c detects the position of the detection light beam that is scanned by the light deflector 311b. The detection light beam passes along a path indicated by the dotted lines in FIG. 20.

The detection light irradiator 311a has a mirror angle detecting light source 321. The light detector 311b has a scanning mirror 322. The detector 311c has a linear detector 323.

The mirror angle detecting light source 321 emits a detection line beam and irradiates the scanning mirror 322 with the detection line beam for detecting the position of the projected image produced by the projecting optical system 113 in the two-dimensional image applied to the magnifying projection system entrance unit 125. The mirror angle detecting light source 321 includes an LED (Light Emitting Diode) or a laser diode.

For example, the mirror angle detecting light source 321 applies the detection light beam as a collimated light beam or applies the detection light beam through a lens to form a small light spot on the linear detector 323. The collimated light beam is a parallel-ray light beam which does not diverge. For example, the detection light beam applied as a collimated light beam from the mirror angle detecting light source 321 forms a light spot having a width which is small enough for the linear detector 323 to detect the position of the detection light beam with a sufficient resolution.

The mirror angle detecting light source 321 may include a light source for emitting invisible light, e.g., an infrared radiation, so that any leakage of the detection light beam will not affect the image displayed on the screen 116.

The scanning mirror 322 includes a so-called galvanometer mirror in the form of a planar mirror. The scanning mirror 322 reflects the light beam from the projecting optical system 113 while it is being angularly moved through a predetermined angle about a given axis. Specifically, the scanning mirror 322 reflects and scans the light beam that has been modulated by the light modulator 112 and applied through the projecting optical system 113. That is, the scanning mirror 322 scans a projected image produced by the projecting optical system 113 in a direction perpendicular to a longitudinal direction of the projected image and reflects the image into a two-dimensional image 126.

The two-dimensional image 126 produced by the scanning operation of the scanning mirror 322 is applied to the magnifying projection system entrance unit 125.

The scanning mirror 322 has a reflecting surface for reflecting a light beam applied thereto from the projecting optical system 113 and another reflecting surface, opposite to the first-mentioned reflecting surface, for reflecting a light beam applied thereto.

The detection light beam emitted from the mirror angle detecting light source 321 is applied to the other reflecting surface of the scanning mirror 322, which is opposite to the reflecting surface for reflecting the light beam applied thereto from the projecting optical system 113. The scanning mirror 322 reflects and scans the modulated light beam from the light modulator 112, and also reflects and scans the detection light beam from the mirror angle detecting light source 321 with the other reflecting surface opposite to the reflecting surface for reflecting the light beam applied thereto from the projecting optical system 113. The detection light beam reflected by the scanning mirror 322 is applied to the linear detector 323.

The linear detector 323 detects the position of the detection light beam applied thereto. The linear detector 323 includes a one-dimensional light position detector having detecting elements on its detecting surface for outputting a signal indicative of the position of the detection light beam thereon.

For example, the linear detector 323 may include a photodiode array, a one-dimensional PSD, a one-dimensional CCD, a one-dimensional CMOS photosensor, or the like.

Since the detection light beam emitted from the mirror angle detecting light source 321 is reflected and scanned by the reflecting surface of the scanning mirror 322 that is opposite to the reflecting surface for reflecting the light beam applied thereto from the projecting optical system 113, the position of the projected image produced by the projecting optical system 113 can be known from the position of the detection light beam reflected by the scanning mirror 322. Specifically, the linear detector 323 detects the position of the projected image produced by the projecting optical system 113 by detecting the position of the detection light beam reflected by the scanning mirror 322.

The linear detector 323 may not be a single unitary photosensor, but may include a plurality of photosensors.

Figure 21:
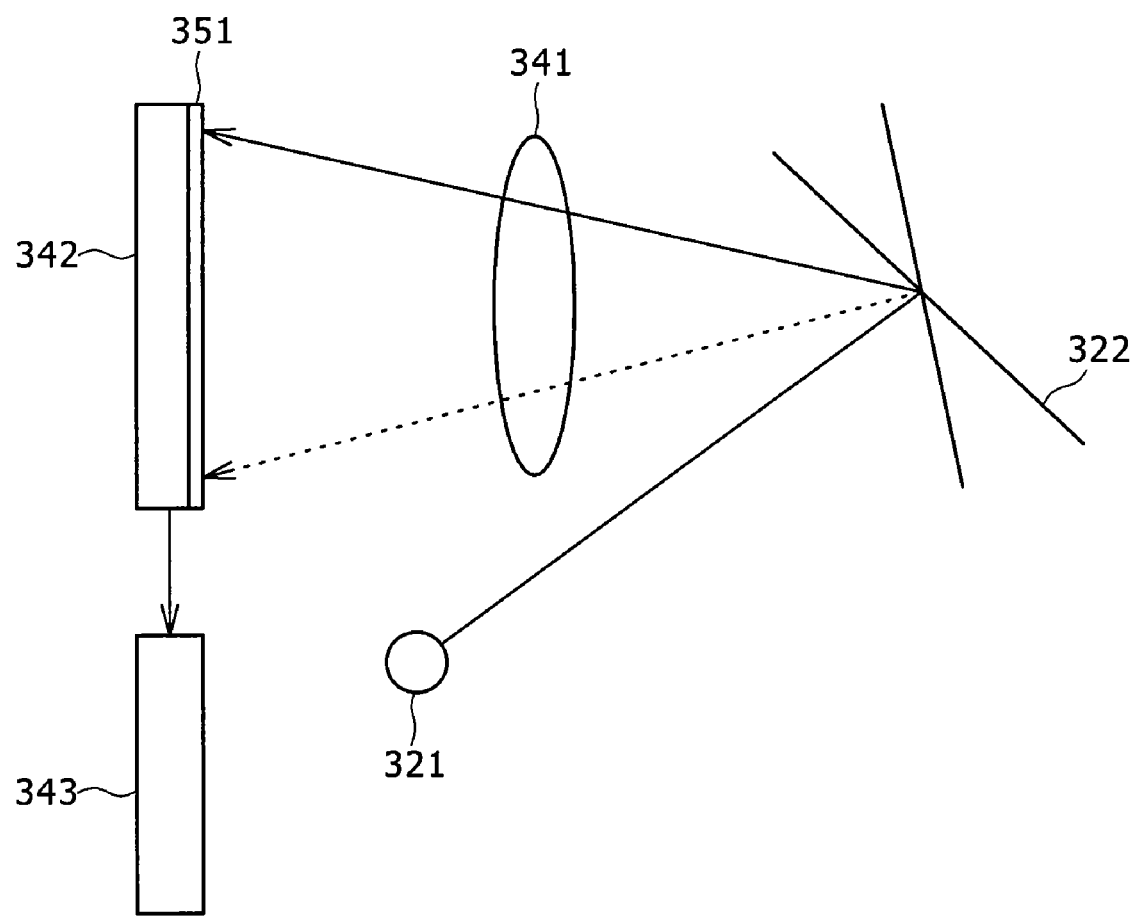
FIG. 21 is a schematic view of a linear detector according to another embodiment.

FIGS. 21 to 24 show a linear detector according to another embodiment. As shown in FIG. 21, a mirror angle detecting light source 321 which includes an LED irradiates a detection light beam to a reflecting surface of a scanning mirror 322 which is opposite to a reflecting surface thereof for reflecting a light beam applied from the projecting optical system 113. The detection light beam reflected by the scanning mirror 322 is focused by a condensing lens 341 disposed in the optical path of the reflected detection light beam into a small light spot on a diffusion plate 342.

Figure 22:
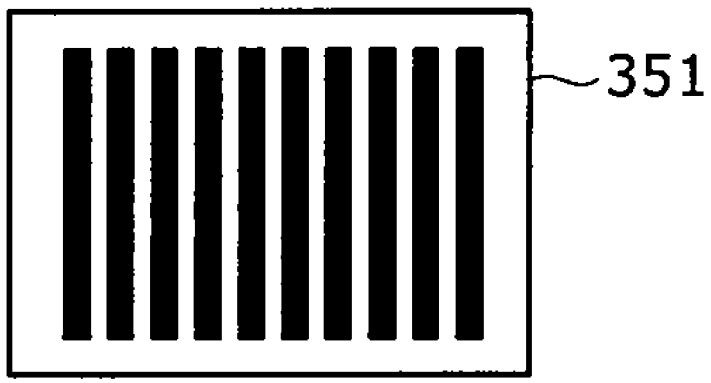
FIG. 22 is a front elevational view of a slit grating of the linear detector shown in FIG. 21.

As shown in FIGS. 21 and 22, a slit grating 351 is disposed on the surface of the diffusion plate 342 which is irradiated with the detection light beam. The slit grating 351 includes an alternate array of light-blocking films and light-transmissive film-free areas or slits which are arranged along the direction in which the position where the scanned detection light beam is moved over the diffusion plate 342. For example, the slit grating 351 may be formed as an evaporated film or the like.

The diameter or width of the light spot of the detection light beam is the same as or smaller than the slit pitch of the slit grating 351.

The diffusion plate 342 diffuses the detection light beam applied thereto through the slit grating 351, and applies the diffused detection light beam to a photodiode 343.

When the scanning mirror 322 is angularly moved, the light spot of the detection light beam travels successively across the light-blocking films and light-transmissive film-free areas of the slit grating 351. Therefore, strong and weak light beams are alternately applied repeatedly to the photodiode 343, which then outputs a signal representing an alternate sequence of repeated high and low levels. The rate at which the high and low levels of the output signal from the photodiode 343 are repeated represents the speed at which the scanning mirror 322 is angularly moved.

The linear detector 323 constructed as shown in FIGS. 21 and 22 is relatively inexpensive to manufacture.

Figure 23:
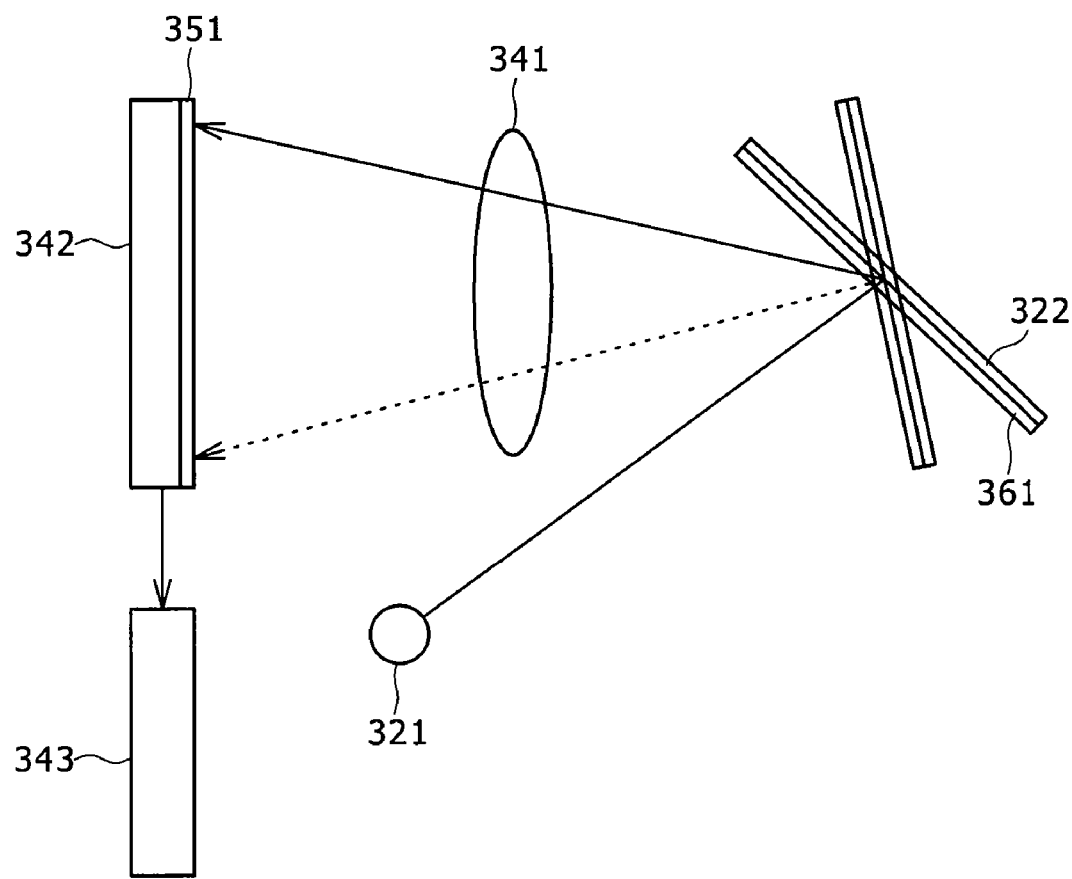
FIG. 23 is a schematic view of a linear detector according to still another embodiment of the present invention.

As shown in FIG. 23, the linear detector differs from the linear detector shown in FIGS. 21 and 22 in that a slit grating 361 is disposed on the surface of the scanning mirror 322 which is irradiated with the detection light beam. The slit grating 361 may be formed as an evaporated film.

Figure 24:
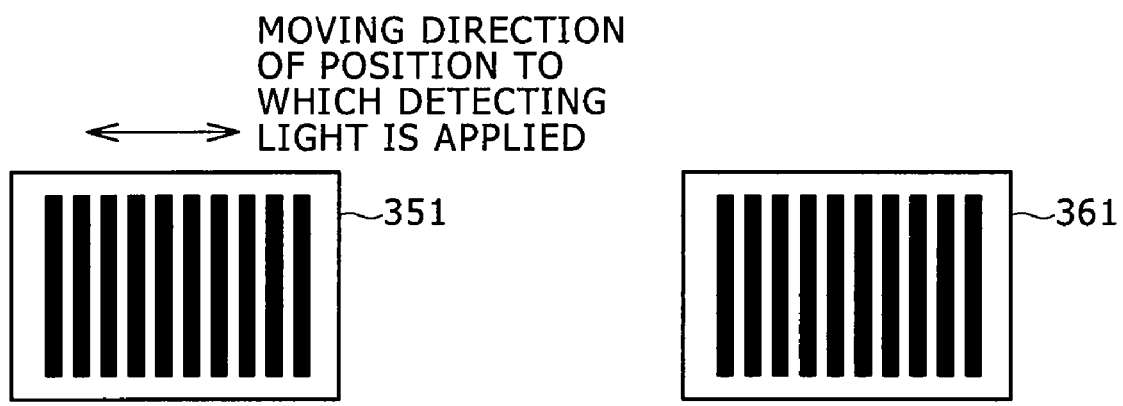
FIG. 24 is a front elevational view of slit gratings of the linear detector shown in FIG. 23.

The condensing lens 341 is positioned such that the slit grating 361 on the scanning mirror 322 and the slit grating 351 on the diffusion plate 342 are in conjugate relation to each other. As shown in FIG. 24, the slit grating 361 on the scanning mirror 322 and the slit grating 351 on the diffusion plate 342 are disposed parallel to each other. In each of the slit grating 361 on the scanning mirror 322 and the slit grating 351 on the diffusion plate 342, each of the light-blocking films is as wide as each of the light-transmissive film-free areas. The ratio of the slit pitch of the slit grating 361 on the scanning mirror 322 and the slit pitch of the slit grating 351 on the diffusion plate 342 is equal to the magnification of the condensing lens 341.

Specifically, the slit grating 351 and the slit grating 361 are constructed such that the slit pitch of the slit grating 351 on the diffusion plate 342 is equal to the slit pitch of an image of the slit grating 361 on the scanning mirror 322, i.e., the slit pitch of an image on the diffusion plate 342.

When the scanning mirror 322 is angularly moved, the image of the slit grating 361 on the scanning mirror 322 moves horizontally on the slit grating 351 on the diffusion plate 342, i.e., along the direction in which the light-blocking films and the light-transmissive film-free areas are arrayed.

The photodiode 343 outputs a signal representing an alternate sequence of repeated high and low levels. The rate at which the high and low levels of the output signal from the photodiode 343 are repeated represents the speed at which the scanning mirror 322 is angularly moved.

Accordingly, the linear detector constructed as shown in FIGS. 23 and 24 is relatively inexpensive to manufacture.

An angular movement control process of the display apparatus 301 is the same as the angular movement control process described above with reference to FIG. 10, and will not be described in detail below.

In the display apparatus 301, since the linear detector 323 does not need to be positioned in the vicinity of the magnifying projection system entrance unit 125, the magnifying projection system entrance unit 125 may suffer less layout limitations and the light deflecting system 311 may be constructed in a unitary layout. Furthermore, because the detecting width of the linear detector 323 can be determined irrespectively of the horizontal width of the two-dimensional image applied to the magnifying projection system entrance unit 125, the position of the scanned image can be detected with a desired resolution and accuracy.

The display apparatus 301 can control the display of images more accurately and can be manufactured more inexpensively.

As described above, when a first image which is produced by a projecting optical system based on a modulated light beam is scanned in a direction perpendicular to the longitudinal direction of the first image to produce a second image, it is possible to display the second image that is formed by scanning the first image based on the modulated light beam. When a first image which is produced by a projecting optical system based on a modulated light beam is scanned and reflected in a direction perpendicular to the longitudinal direction of the first image to produce a second image, and when a detection light beam different from the modulated light beam is applied, the position of the reflected detection light beam is detected to detect the position of the first image in the second image, and the operation of a reflecting section is controlled based on the position of the first image in the second image, the display of the second image can be controlled more accurately with an inexpensive arrangement.

In the above embodiments, the light modulator includes a GLV which is a one-dimensional light modulator. However, the light modulator is not limited to a GLV, but may include a DMD (Digital Micromirror Device (registered trademark)) or an LCOS (Liquid Crystal on Silicon) device which is a two-dimensional light modulator. The light source 111 may include a metal halide lamp, a high-pressure mercury lamp, or the like depending on the light modulator that is employed.

The principles described in the present application are applicable to a display apparatus for projecting light onto the screen 116 to display an image on the screen 116, e.g., a front projector, a rear projector, or the like.

Although certain preferred embodiments of the present applicaiton have been shown and described in detail, it should be appreciated that various changes and modifications may be made therein without departing from the scope of the appended claims.

The invention is claimed as follows:

1. An apparatus for displaying an image, comprising:
   a projecting optical system for producing a first image based on a modulated light beam;
   a reflecting section having first and second reflecting surfaces and for scanning, on the first reflecting surface, said first image produced by said projecting optical system in a direction perpendicular to a longitudinal direction of said first image to produce a second image;
   an irradiating section for irradiating the second reflecting surface of the reflecting section with a detection light beam which is different from said modulated light beam;
   a detecting section for detecting the position of said detection light beam reflected by said reflecting section to detect the position of said first image reflected by said reflecting section in said second image; and
   a control section for controlling operation of said reflecting section based on the position of said first image in said second image as detected by said detecting section,
   wherein said reflecting section has a first reflecting surface for reflecting said first image and a second reflecting surface for reflecting said second image, said irradiating section applies said detection light beam to said second reflecting surface of said reflecting section, and said detecting section detects the position of said detection light beam reflected by said second reflecting surface of said reflecting section to detect the position of said first image in said second image.

2. The apparatus according to claim 1, wherein said reflecting section comprises a galvanometer mirror, a polygon mirror, or a polygon prism.

3. The apparatus according to claim 1, wherein said irradiating section comprises a light source.

4. The apparatus according to claim 1, further comprising:
   a light source for emitting a light beam to produce said first image;
   wherein said irradiating section comprises a light modulator for modulating the light beam emitted by said light source and reflecting the light beam emitted
   by said light source separately from said modulated light, as said detection light beam to irradiate said reflecting section, and said detection light beam reflected by said light modulator is applied through said projecting optical system to said reflecting section.

5. A method of displaying an image comprising:
   producing with a projecting optical system a first image based on a modulated light beam
   scanning with a reflecting section having first and second reflecting surfaces, on the first reflecting surface, said first image produced by said projecting optical system in a direction perpendicular to a longitudinal direction of said first image to produce a second image;
   irradiating the second reflecting surface of the reflecting section with a detection light beam which is different from said modulated light beam;
   detecting the position of said detection light beam reflected by said reflecting section to detect the position of said first image reflected by said reflecting section in said second image; and
   controlling operation of said reflecting section based, on the position of said first image in said second image as detected in said step of detecting the position of said detection light beam,
   wherein said reflecting section has a first reflecting surface for reflecting said first image and a second reflecting surface for reflecting said second image, said irradiating section applies said detection light beam to said second reflecting surface of said reflecting section, and said detecting section detects the position of said detection light beam reflected by said second reflecting surface of said reflecting section to detect the position of said first image in said second image.

6. The apparatus according to claim 1 wherein said first image is a one-dimensional image and said second image is a two-dimensional image.

7. The apparatus according to claim 1 further comprising a magnifying projection system for projecting said second image onto a screen.

8. The apparatus according to claim 1 wherein the detection light beam comprises invisible light.

9. The method according to claim 5 further comprising magnifying and projecting said second image onto a screen.

10. The apparatus according to claim 1 wherein the second reflecting surface is positioned opposite to the first reflecting surface.

11. The method according to claim 5 wherein the second reflecting surface is positioned opposite to the first reflecting surface.

* * * * *